(12) United States Patent
Gyotoku et al.

(10) Patent No.: US 9,718,256 B2
(45) Date of Patent: Aug. 1, 2017

(54) STEEL MATERIAL FOR NITRIDING AND NITRIDED COMPONENT

(71) Applicant: NIPPON STEEL & SUMITOMO METAL CORPORATION, Tokyo (JP)

(72) Inventors: Yuya Gyotoku, Tokyo (JP); Masayuki Horimoto, Tokyo (JP); Hideki Imataka, Tokyo (JP); Kosuke Tanaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 257 days.

(21) Appl. No.: 14/386,028

(22) PCT Filed: Feb. 4, 2013

(86) PCT No.: PCT/JP2013/052463
§ 371 (c)(1),
(2) Date: Sep. 18, 2014

(87) PCT Pub. No.: WO2013/140869
PCT Pub. Date: Sep. 26, 2013

(65) Prior Publication Data
US 2015/0027591 A1   Jan. 29, 2015

(30) Foreign Application Priority Data

Mar. 22, 2012 (JP) ................. 2012-064740

(51) Int. Cl.
| | |
|---|---|
| *C23C 8/26* | (2006.01) |
| *C23C 8/38* | (2006.01) |
| *C23C 8/50* | (2006.01) |
| *C21D 1/06* | (2006.01) |
| *C23C 8/32* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/40* | (2006.01) |
| *C22C 38/26* | (2006.01) |
| *C22C 38/28* | (2006.01) |
| *C22C 38/38* | (2006.01) |
| *C22C 38/42* | (2006.01) |
| *C22C 38/46* | (2006.01) |
| *C22C 38/60* | (2006.01) |
| *C22C 38/50* | (2006.01) |

(Continued)

(52) U.S. Cl.
CPC ............ *B32B 15/18* (2013.01); *C21D 1/06* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/38* (2013.01); *C22C 38/40* (2013.01); *C22C 38/42* (2013.01); *C22C 38/46* (2013.01); *C22C 38/50* (2013.01); *C22C 38/60* (2013.01); *C23C 8/26* (2013.01); *C23C 8/32* (2013.01); *C23C 8/38* (2013.01); *C23C 8/50* (2013.01); *C21D 9/32* (2013.01); *C21D 2211/002* (2013.01); *C21D 2211/005* (2013.01); *C21D 2211/009* (2013.01); *Y02P 10/212* (2015.11)

(58) Field of Classification Search
CPC ..... B32B 15/18; C22C 38/001; C22C 38/002; C22C 38/02; C22C 38/04; C22C 38/06; C22C 38/20; C22C 38/22; C22C 38/24; C22C 38/26; C22C 38/28; C22C 38/38; C22C 38/40; C22C 38/42; C22C 38/46; C22C 38/60; C23C 8/26; C23C 8/32; C23C 8/38; C23C 8/50; C21D 1/06; C21D 9/32; C21D 2211/002; C21D 2211/005; C21D 2211/009; Y02P 10/212
See application file for complete search history.

(56) References Cited

FOREIGN PATENT DOCUMENTS

| | | |
|---|---|---|
| CN | 1271232 | 8/2006 |
| CN | 101835916 | 9/2010 |

(Continued)

OTHER PUBLICATIONS

Imataka et al., English machine translation of JP 2007-332421, Dec. 2007, p. 1-35.*

*Primary Examiner* — Roy King
*Assistant Examiner* — Caitlin Kiechle
(74) *Attorney, Agent, or Firm* — Clark & Brody

(57) ABSTRACT

A steel material for nitriding has a composition comprising, by mass percent, C: more than 0.15% and not more than 0.35%, Si≤0.20%, Mn: 0.10 to 2.0%, P≤0.030%, S≤0.050%, Cr: 0.80 to 2.0%, V: 0.10 to 0.50%, Al: 0.01 to 0.06%, N≤0.0080%, O≤0.0030%, and optionally one or more elements of Mo, Cu, Ni, Ti, Nb, Zr, Pb, Ca, Bi, Te, Se and Sb, the balance being Fe and impurities. The composition satisfies the conditions of $[20 \le (669.3 \times \log_e C - 1959.6 \times \log_e N - 6983.3) \times (0.067 \times Mo + 0.147 \times V) \le 80]$ and $[140 \times Cr + 125 \times Al + 235 \times V \ge 160]$. The microstructure is a ferritic-pearlitic structure, a ferritic-bainitic structure, or a ferritic-pearlitic-bainitic structure. The area fraction of ferrite is 20% or more and the precipitate content of V is 0.10% or less.

4 Claims, 11 Drawing Sheets

(51) Int. Cl.
    *C21D 9/32*    (2006.01)
    *B32B 15/18*   (2006.01)

(56)         References Cited

FOREIGN PATENT DOCUMENTS

| | | |
|---|---|---|
| CN | 102378822 | 3/2012 |
| CN | 102471842 | 5/2012 |
| CN | 102597290 | 7/2012 |
| CN | 102686759 | 9/2012 |
| JP | 59-190321 | 10/1984 |
| JP | 05-025538 | 2/1993 |
| JP | 06-025797 | 2/1994 |
| JP | 09-071841 | 3/1997 |
| JP | 2005-281857 | 10/2005 |
| JP | 2007332421 A * | 12/2007 |
| WO | 2012/053541 | 4/2012 |

* cited by examiner

Chip length

Block test piece A

Ring test piece

→ : Measuring direction of wear depth

Contact

Indentation test jig

Indentation deformation amount

Block test piece B

STEEL MATERIAL FOR NITRIDING AND NITRIDED COMPONENT

TECHNICAL FIELD

The present invention relates to a steel material for nitriding and nitrided component. More specifically, the present invention relates to a steel material for nitriding which is excellent in machinability, particularly in chip disposability, and also can provide a component subjected to a nitriding treatment with high core hardness, high surface hardness and a large effective case depth, and is used suitably as a starting material for a nitrided component, and in addition relates to a nitrided component using the same.

The "nitriding" in the present invention is a treatment including the "nitrocarburizing" treatment in which "N and C are caused to invade and diffuse", not merely the "nitriding" treatment in which "N is caused to invade and diffuse". Therefore, in the explanation below, a treatment including the "nitrocarburizing" is referred simply to as the "nitriding".

BACKGROUND ART

A component for machine structural use that is used for an automobile transmission and the like, such as a gear and a pulley for a belt-type continuously variable transmission (CVT), is usually subjected to surface hardening treatments from the viewpoint of improving bending fatigue strength, pitting strength, and wear resistance. There are typical surface hardening treatments such as "carburizing and quenching", "induction quenching", and "nitriding".

Among the treatments mentioned above, the "carburizing and quenching" is a treatment in which a low carbon steel is generally used; and in the said treatment, C is caused to invade and diffuse in an austenitic region of a high temperature not less than the $Ac_3$ point, and thereafter quenching is carried out. The "carburizing and quenching" has an advantage of attaining a high surface hardness and a large effective case depth, but this treatment is accompanied by phase transformation; and thus in the said treatment, there is a problem that the heat treating distortion becomes large. Therefore, in the case where the high component accuracy is required, it is necessary to carry out a finish working, which is grinding, honing and so on, after the "carburizing and quenching". In addition, the "carburizing and quenching" has a problem that a so-called "abnormal carburized layer", which is an intergranularly oxidized layer, non-martensitic layer and so on, produced on the outer layer becomes a start point of failure such as bending fatigue failure, and the fatigue strength is deteriorated.

The "induction quenching" is a treatment in which a steel is rapidly heated to an austenitic region of a high temperature not less than the $Ac_3$ point and thereafter quenched. The "induction quenching" has an advantage that the effective case depth can be controlled with relative ease, but this treatment is not a surface hardening treatment in which C is caused to invade and diffuse like the carburizing treatment. Therefore, in the case of the "induction quenching", in order to attain necessary surface hardness, effective case depth and core hardness, a medium carbon steel, which has a higher C content as compared with a steel for carburizing treatment, is generally used. However, as for a starting material, the medium carbon steel has a higher hardness than the low carbon steel; and thus there is a problem that steels for the said "induction quenching" are inferior in machinability. In addition, with regard to the "induction quenching", a high frequency heating coil must be prepared for each component.

In contrast, the "nitriding" is a treatment in which N is caused to invade and diffuse at a temperature of about 400 to 550° C. not more than the $Ac_1$ point, and thereby a high surface hardness and a proper effective case depth are attained. In the case of the "nitriding", as compared with the "carburizing and quenching" and the "induction quenching", the treatment temperature is low; and therefore the said "nitriding" has an advantage that the heat treating distortion is small.

In addition, in the "nitriding", the "nitrocarburizing" is a treatment in which N and C are caused to invade and diffuse at a temperature of about 500 to 650° C. not more than the $Ac_1$ point, and thereby a high surface hardness is attained. This treatment is suitable for mass production because the treatment time is as short as several hours.

Furthermore, along with the trend toward the reduction in greenhouse gas with the recent restraint of global warming being a background, it has been demanded that a process in which a material treated is held at a high temperature, such as "carburizing and quenching", be reduced. Therefore, the "nitriding" is a treatment responding to the demand of the day.

Unfortunately, the conventional steel material for nitriding has problems described in the following <1> and <2>.

<1> The "nitriding" is a surface hardening treatment in which quenching from an austenitic region of a high temperature is not performed, that is to say, it is a surface hardening treatment in which strengthening accompanied by the martensitic transformation cannot be performed. Therefore, in order to provide a nitrided component with the desired core hardness, it is necessary to contain a large amount of alloying elements. Thus, the hardness of the starting material becomes high, and therefore the machinability is deteriorated.

<2> As for a typical steel for nitriding, the "Aluminum Chromium Molybdenum Steel (SACM645)" specified in JIS G 4053 (2008) is available. With regard to the steel of this type, unfortunately, although a high surface hardness can be attained because Cr, Al and the like produce nitrides near the surface, a high bending fatigue strength cannot be attained because of a shallow effective case depth.

Accordingly, in order to solve the problems mentioned above, for example, the Patent Literatures 1 and 2 disclose techniques concerning the "nitriding".

The Patent Literature 1 discloses a "material for nitrided component", which enables a complicated hole shape to be easily broached and has an excellent surface hardness and hardening depth after the nitrocarburizing treatment. The "material for nitrided component" comprises, by mass percent, of C: 0.10 to 0.40%, Si: 0.50% or less, Mn: 0.30 to 1.50%, Cr: 0.30 to 2.00%, V: more than 0.15% and not more than 0.50%, and Al: 0.02 to 0.50%, and further according to need one or more of Ni, Mo, S, Bi, Se, Ca, Te, Nb, and Ti, with the balance being Fe and impurities. The "material for nitrided component" consists of a ferritic-pearlitic structure having a ferrite hardness of not less than 190 in Vickers hardness.

The Patent Literature 2 discloses a "method for producing a low strain high strength member". The Patent Literature 2 discloses that a component for machine structural use, which reduces a strain amount in surface hardening treatment and is excellent in wear resistance and fatigue strength, can be obtained by the "method for producing a low strain high strength member". The "method for producing a low strain high strength member" provides a technique in which a steel material comprising, by mass percent, C: 0.10 to 0.25%, Si: 0.50% or less, Mn: 0.50 to 1.50%, Cr: 0.5 to 2.0%, Mo: 0.1 to 1.0%, V: 0.05 to 0.50%, Al: 0.50% or less, and further according to need B: 0.0040 to 0.0200%, and N: 0.005 to 0.025%, with the balance being Fe and impurities is subjected to forging at a temperature of 900 to 1050° C. which is less than a normal hot forging temperature, subsequently being subjected to machining to form a shape of member, and thereafter is subjected to nitrocarburizing treatment at a temperature of 550 to 600° C.

LIST OF PRIOR ART DOCUMENT

Patent Literatures

Patent Literature 1: JP 2005-281857 A
Patent Literature 2: JP 5-25538 A

SUMMARY OF THE INVENTION

Problems to be Solved by the Invention

The steel disclosed in the Patent Literature 1 aims to improve a machinability in a low speed region by increasing the ferrite hardness of the ferritic-pearlitic structure. However, since an area fraction of the ferrite in the structure is not considered, sufficient chip disposability cannot necessarily be attained in the steel of the Patent Literature 1.

The steel disclosed in the Patent Literature 2 contains Mo: 0.1 to 1.0% in combination with V in order to attain high core hardness, so that the hardness of the starting material becomes high and therefore sufficient machinability cannot necessarily be attained.

The present invention has been made in view of the above-described situations, and accordingly the objective thereof is to provide a steel material for nitriding, which is excellent in machinability after forging, and also can provide a component subjected to a nitriding treatment with high core hardness and high surface hardness and a large effective case depth, and is used suitably as a starting material for a nitrided component.

In the concrete, the objective of the present invention is to provide a steel material for nitriding, which has a hardness before cutting of 150 to 250 in Vickers hardness (hereinafter, sometimes referred to as the "HV"), low cutting resistance, and an excellent chip disposability, and further can attain the following hardness properties after nitriding; the core hardness: 180 or more in HV, the surface hardness: 650 or more in HV, and the effective case depth: 0.20 mm or more.

Another objective of the present invention is to provide a nitrided component using the said steel material for nitriding.

Means for Solving the Problems

Based on technical ideas that an excellent machinability can be attained by keeping an amount of alloying elements to a necessary minimum and controlling a structural state before cutting, a high surface hardness and a large effective case depth can be attained by nitriding treatment, and a high core hardness can be attained by age hardening at a nitriding temperature, the present inventors carried out experiments repeatedly. As a result, the present inventors obtained the following findings (a) to (e).

(a) If Cr and Al are contained in the steel, the surface hardness can be increased by nitriding.

(b) In order to attain a higher surface hardness by nitriding and to increase the amount of age hardening at the nitriding temperature, it is effective to contain V in the steel while the content of N in the steel is restricted. In addition, if Mo is contained in the above mentioned steel, a larger amount of age hardening can be attained.

(c) On the other hand, if Cr and V are contained in the steel, the cutting resistance becomes high and the tool life is reduced. The suppression of an increase in the cutting resistance by restricting the contents of individual component elements without decreasing the core hardness has a limit. However, if the content of N is restricted and the precipitation of the nitrides and carbo-nitrides of V in the steel material is suppressed, an increase in the cutting resistance can be suppressed, and if the microstructure of the steel material is controlled in appropriate state, an excellent chip disposability can be ensured.

(d) If the content of N is restricted, the precipitation of the nitrides and carbides of V can be suppressed at the time of hot rolling, and carbides, nitrides, and carbo-nitrides of V can be effectively precipitated at the nitriding temperature. In addition, if Mo is contained in the steel, carbides of Mo can be effectively precipitated at the nitriding temperature. As a result, a large amount of age hardening can be attained, and in addition, strengthening due to age hardening can be achieved.

The present invention has been accomplished on the basis of the above-described findings. The main points of the present invention are the steel materials for nitriding described below and the nitrided components described below.

(1) A steel material for nitriding, having a chemical composition comprising, by mass percent, C: more than 0.15% and not more than 0.35%, Si: 0.20% or less, Mn: 0.10 to 2.0%, P: 0.030% or less, S: 0.050% or less, Cr: 0.80 to 2.0%, V: 0.10 to 0.50%, Al: 0.01 to 0.06%, N: 0.0080% or less, and O: 0.0030% or less, with the balance being Fe and impurities, and further the Fn1 expressed by the formula (1) described below is 20 to 80, and the Fn2 expressed by the formula (2) described below is 160 or more; wherein the microstructure of the steel material is a ferritic-pearlitic structure, a ferritic-bainitic structure, or a ferritic-pearlitic-bainitic structure, the area fraction of ferrite in the microstructure is 20% or more, and the content of V in precipitates determined by the extraction residue analysis is 0.10% or less.

$$Fn1=(669.3 \times \log_e C - 1959.6 \times \log_e N - 6983.3) \times (0.067 \times Mo + 0.147 \times V) \tag{1}$$

$$Fn2=140 \times Cr + 125 \times Al + 235 \times V \tag{2}$$

Each symbol C, N, Mo, V, Cr and Al in the above formulas (1) and (2) represents the content by mass percent of the element concerned.

(2) A steel material for nitriding, having a chemical composition comprising, by mass percent, C: more than 0.15% and not more than 0.35%, Si: 0.20% or less, Mn: 0.10 to 2.0%, P: 0.030% or less, S: 0.050% or less, Cr: 0.80 to 2.0%, V: 0.10 to 0.50%, Al: 0.01 to 0.06%, N: 0.0080% or less, O: 0.0030% or less, and one or more kinds of elements selected from the items <a> to <d> described below with the balance being Fe and impurities, and further the Fn1 expressed by the formula (1) described below is 20 to 80, and the Fn2 expressed by the formula (2) described below is 160 or more; wherein the microstructure of the steel material is a ferritic-pearlitic structure, a ferritic-bainitic structure, or a ferritic-pearlitic-bainitic structure, the area fraction of ferrite in the microstructure is 20% or more, and the content of V in precipitates determined by the extraction residue analysis is 0.10% or less.

$$Fn1=(669.3 \times \log_e C-1959.6 \times \log_e N-6983.3) \times (0.067 \times Mo+0.147 \times V) \quad (1)$$

$$Fn2=140 \times Cr+125 \times Al+235 \times V \quad (2)$$

Each symbol C, N, Mo, V, Cr and Al in the above formulas (1) and (2) represents the content by mass percent of the element concerned.

<a> Mo: less than 0.10%

<b> Cu: 0.50% or less and Ni: 0.50% or less

<c> Ti: 0.20% or less, Nb: 0.10% or less and Zr: 0.10% or less

<d> Pb: 0.50% or less, Ca: 0.010% or less, Bi: 0.30% or less, Te: 0.30% or less, Se: 0.30% or less, and Sb: 0.30% or less (3) A nitrided component having a chemical composition according to the above item (1), wherein the core hardness thereof is 180 or more in Vickers hardness, the surface hardness thereof is 650 or more in Vickers hardness, and the effective case depth thereof is 0.20 mm or more.

(4) A nitrided component having a chemical composition according to the above item (2), wherein the core hardness thereof is 180 or more in Vickers hardness, the surface hardness thereof is 650 or more in Vickers hardness, and the effective case depth thereof is 0.20 mm or more.

The term "impurities" so referred to in the phrase "the balance being Fe and impurities" indicates those elements which come from the raw materials such as ore and scrap, and/or the production environment when the steel material is produced on an industrial scale.

The "ferritic-pearlitic structure" indicates a composite microstructure of ferrite and pearlite, the "ferritic-bainitic structure" indicates a composite microstructure of ferrite and bainite, and the "ferritic-pearlitic-bainitic structure" indicates a composite microstructure of ferrite, pearlite, and bainite. The "area fraction of ferrite" does not include the area fraction of ferrite which constitutes pearlite together with cementite.

Advantageous Effects of the Invention

The steel material for nitriding of the present invention is excellent in machinability, particularly in chip disposability, and also can provide a component subjected to a nitriding treatment with high core hardness, high surface hardness and a large effective case depth. Therefore, the steel material for nitriding of the present invention is used suitably as a starting material for a nitrided component.

In addition, the nitrided component of the present invention is excellent in deformation resistance, bending fatigue strength, and wear resistance; and therefore it can be used suitably as a component for machine structural use that is used for an automobile transmission and the like, such as a gear and a pulley for a CVT.

MODE FOR CARRYING OUT THE INVENTION

Figure 1:
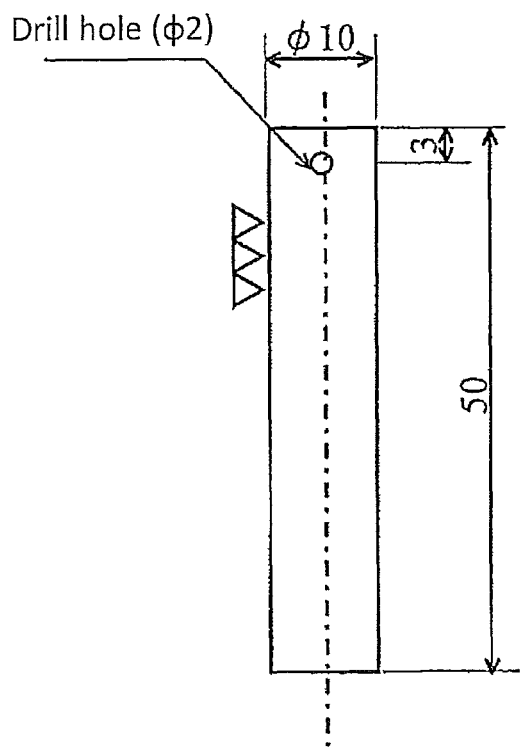
FIG. 1 is a view showing a shape of a round bar test piece for measuring hardness and so on after nitriding used in the EXAMPLES. In this figure, the units of the dimensions are "mm".

In the following, the requirements of the present invention are described in detail. In the following description, the symbol "%" for the content of each element means "% by mass".

(A) Chemical Composition:

C: More than 0.15% and not More than 0.35%

C (carbon) is an essential element for ensuring the machinability and the bending fatigue strength and core hardness of the nitrided component, and more than 0.15% of C must be contained. If the content of C is too low, the hardness decreases, and thereby the bending fatigue strength deteriorates. In addition, if the content of C is too low, the soft ferrite increases, and thereby the chip disposability deteriorates. This causes a deterioration in the machinability. On the other hand, if the content of C is too large, the hardness increases, and thereby the cutting resistance becomes high. This causes a deterioration in the machinability. Therefore, the upper limit of the C content is set; and the content of C is set to more than 0.15% and not more than 0.35%. The content of C is preferably set to 0.18% or more, and 0.30% or less.

Si: 0.20% or Less

Si (silicon) is an element contained as an impurity in the steel. On the other hand, Si is also an element having a deoxidizing action. When the content of Si is too large, the hardness increases; and thereby the machinability deteriorates. Therefore, the upper limit of the Si content is set; and the content of Si is set to 0.20% or less. In order to accomplish the deoxidizing action, the content of Si is preferably set to 0.02% or more. In addition, the content of Si is preferably set to 0.15% or less.

Mn: 0.10 to 2.0%

Mn (manganese) has an action for ensuring the bending fatigue strength and core hardness of the nitrided component, and also has a deoxidizing action. In order to achieve these effects, 0.10% or more of Mn must be contained. However, if the content of Mn is too large, the hardness increases, and thereby the machinability deteriorates. Therefore, the upper limit of the Mn content is set; and the content of Mn is set to 0.10 to 2.0%. The content of Mn is preferably set to 0.20% or more, and 1.5% or less.

P: 0.030% or Less

P (phosphorous) is contained in the steel as an impurity. When the content of P is too large, P which segregated at the grain boundaries sometimes makes the steel brittle. Therefore, the upper limit of the P content is set; and the content of P is set to 0.030% or less. The more preferable P content is 0.020% or less.

S: 0.050% or Less

S (sulfur) is contained in the steel as an impurity. In addition, if S is contained positively, S combines with Mn to form MnS, and therefore S has an effect of improving the machinability. However, if the content of S exceeds 0.050%, coarse MnS is formed, so that the hot workability and bending fatigue strength deteriorate. Therefore, the content of S is set to 0.050% or less. The content of S is preferably set to 0.040% or less. Incidentally, the content of S is preferably set to 0.003% or more, and further preferably set to 0.005% or more.

Cr: 0.80 to 2.0%

Cr (chromium) combines with N at the time of nitriding to produce nitrides, and therefore Cr has effects of increasing the surface hardness in nitriding and of ensuring the bending fatigue strength and wear resistance of the nitrided component. However, if the content of Cr is less than 0.80%, the above-described effects cannot be achieved. On the other hand, if the content of Cr exceeds 2.0%, the steel becomes hard, and thus the machinability deteriorates. Therefore, the content of Cr is set to 0.80 to 2.0%. The content of Cr is preferably set to 0.90% or more, and 1.5% or less.

V: 0.10 to 0.50%

V (vanadium) combines with C or/and N at the time of nitriding to form carbides, nitrides, and carbo-nitrides, and therefore V has an effect of increasing the surface hardness. In addition, V has an effect of increasing the core hardness by the age hardening action at a nitriding temperature, that is to say, by forming carbides. In order to achieve these effects, 0.10% or more of V must be contained. However, if the content of V is large, not only the hardness becomes too high, but also the machinability deteriorates. Therefore, the upper limit of the V content is set; and the content of V is set to 0.10 to 0.50%. The content of V is preferably set to 0.15% or more, and 0.40% or less.

Al: 0.01 to 0.06%

Al (aluminum) has a deoxidizing action. In addition, Al combines with N at the time of nitriding to form AlN, and therefore Al has an effect of increasing the surface hardness. In order to achieve these effects, 0.01% or more of Al must be contained. However, if the content of Al is too large, not only hard and coarse $Al_2O_3$ is formed and therefore the machinability deteriorates, but also there arises a problem that the effective case depth in nitriding becomes shallow and the bending fatigue strength and pitting strength deteriorate. Therefore, the upper limit of the Al content is set; and the content of Al is set to 0.01 to 0.06%. The content of Al is preferably set to 0.02% or more, and 0.05% or less.

N: 0.0080% or Less

N (nitrogen) forms nitrides and carbo-nitrides. If the nitrides and carbo-nitrides of V or the like have precipitated at the time of hot rolling, the hardness becomes high, and the machinability deteriorates. In addition, the effect of increasing the core hardness due to age hardening at a nitriding temperature cannot be achieved sufficiently. Therefore, the N content must be restricted; so that the content of N is set to 0.0080% or less. The preferable N content is 0.0070% or less.

O: 0.0030% or Less

O (oxygen) forms oxide type inclusions and causes a fatigue failure with the inclusions, which become a starting point of the failure; and thus O degrades the bending fatigue strength. If the content of O exceeds 0.0030%, the bending fatigue strength deteriorates remarkably. Therefore, the content of O is set to 0.0030% or less. Incidentally, the preferable O content is 0.0020% or less.

One of the steel materials for nitriding of the present invention has a chemical composition consisting of aforementioned elements from C to O with the balance being Fe and impurities, and this chemical composition satisfies the conditions for the Fn1 and Fn2 described below. Incidentally, as already described, the term "impurities" so referred to in the phrase "Fe and impurities" indicates those elements which come from the raw materials such as ore and scrap, and/or the production environment when the steel material is produced on an industrial scale.

Another of the steel materials for nitriding of the present invention has a chemical composition, which contains one or more elements selected from Mo, Cu, Ni, Ti, Nb, Zr, Pb, Ca, Bi, Te, Se and Sb in lieu of a part of Fe mentioned above and satisfies the conditions for the Fn1 and Fn2.

Hereunder, the effects of containing Mo, Cu, Ni, Ti, Nb, Zr, Pb, Ca, Bi, Te, Se and Sb, which are optional elements, and the reasons for the restriction of content thereof are explained.

Mo: Less than 0.10%

Mo (molybdenum) described in the item <a> combines with C at a nitriding temperature to form carbides, and therefore Mo has an action for increasing the core hardness due to age hardening, so that Mo can be contained to achieve the above effect. However, if Mo is contained 0.10% or more, the hardness increases, and the machinability deteriorates. Therefore, if Mo is contained, the content of Mo is set to less than 0.10%. Incidentally, when Mo is contained, the content of Mo is preferably 0.08% or less.

On the other hand, in the case where Mo is contained, in order to stably achieve the above-described effect of Mo, it is preferable that the content of Mo be 0.05% or more.

Both of Cu and Ni described in the item <b> have an action for increasing the core hardness. Therefore, in order to achieve the above effect, these elements can be contained. In the following, the above-mentioned Cu and Ni will be explained.

Cu: 0.50% or Less

Cu (copper) has an action for increasing the core hardness, and therefore, in order to achieve the above effect, Cu can be contained. However, if the content of Cu becomes large, the machinability deteriorates, and additionally at high temperatures under hot rolling and so on, Cu fuses into a liquid. The liquefied Cu permeates into grain boundaries and makes the said grain boundaries brittle, and thus causes surface defects in hot rolling. Therefore, if Cu is contained, the upper limit of the Cu content is set; and the content of Cu is set to 0.50% or less. When Cu is contained, the content of Cu is preferably 0.40% or less.

On the other hand, in the case where Cu is contained, in order to stably achieve the above-described effect of Cu, it is preferable that the content of Cu be 0.10% or more.

Ni: 0.50% or Less

Ni (nickel) has an action for increasing the core hardness, and therefore, in order to achieve the above effect, Ni can be contained. However, if the content of Ni becomes large, the machinability deteriorates. Therefore, if Ni is contained, the upper limit of the Ni content is set; and the content of Ni is set to 0.50% or less. When Ni is contained, the content of Ni is preferably 0.40% or less.

On the other hand, in the case where Ni is contained, in order to stably achieve the above-described effect of Ni, it is preferable that the content of Ni be 0.10% or more.

With regard to the aforementioned Cu and Ni, only one or a combination of two elements can be contained. The total amount in the case where these elements are contained compositely can be 1.00% when both of the Cu content and the Ni content take the respective upper limit values: however, the said total amount is preferably 0.80% or less. In addition, in the case where Cu is contained, Ni is preferably contained compositely in order to avoid the occurrence of surface defects in hot rolling described above.

All of Ti, Nb and Zr described in the item <c> have an action for improving the bending fatigue strength by making the grains fine. Therefore, in order to achieve the above effect, these elements can be contained. In the following, the aforementioned Ti, Nb and Zr will be explained.

Ti: 0.20% or Less

Ti (titanium) combines with C or/and N to form fine carbides, nitrides, and carbo-nitrides which make the grains fine; and thus Ti has an action for improving the bending fatigue strength. Therefore, in order to achieve the above effect, Ti can be contained. However, in the case where the content of Ti is large, coarse TiN is produced, and thus the bending fatigue strength rather deteriorates. Therefore, if Ti is contained, the upper limit of the Ti content is set; and the content of Ti is set to 0.20% or less. When Ti is contained, the content of Ti is preferably 0.10% or less.

On the other hand, in the case where Ti is contained, in order to stably achieve the above-described effect of Ti, it is preferable that the content of Ti be 0.005% or more.

Nb: 0.10% or Less

Nb (niobium) combines with C or/and N to form fine carbides, nitrides, and carbo-nitrides which make the grains fine; and thus Nb has an action for improving the bending fatigue strength. Therefore, in order to achieve the above effect, Nb can be contained. However, in the case where the content of Nb is large, the hardness increases, and the machinability deteriorates. Therefore, if Nb is contained, the upper limit of the Nb content is set; and the content of Nb is set to 0.10% or less. When Nb is contained, the content of Nb is preferably 0.07% or less.

On the other hand, in the case where Nb is contained, in order to stably achieve the above-described effect of Nb, it is preferable that the content of Nb be 0.020% or more.

Zr: 0.10% or Less

Zr (zirconium) also combines with C or/and N to form fine carbides, nitrides, and carbo-nitrides which make the grains fine; and thus Zr has an action for improving the bending fatigue strength. Therefore, in order to achieve the above effect, Zr can be contained. However, in the case where the content of Zr is large, the hardness increases, and the machinability deteriorates. Therefore, if Zr is contained, the upper limit of the Zr content is set; and the content of Zr is set to 0.10% or less. When Zr is contained, the content of Zr is preferably 0.07% or less.

On the other hand, in the case where Zr is contained, in order to stably achieve the above-described effect of Zr, it is preferable that the content of Zr be 0.002% or more.

With regard to the aforementioned Ti, Nb and Zr, only one or a combination of two or more elements can be contained. The total amount in the case where these elements are contained compositely can be 0.40% when all of the contents of Ti, Nb and Zr take the respective upper limit values: however, the said total amount is preferably 0.24% or less.

All of Pb, Ca, Bi, Te, Se and Sb described in the item <d> have an action for improving the machinability. Therefore, in order to achieve the above effect, these elements can be contained. In the following, the aforementioned Pb, Ca, Bi, Te, Se and Sb will be explained.

Pb: 0.50% or Less

Pb (lead) has an action for improving the machinability. Therefore, in order to achieve the above effect, Pb can be contained. However, in the case where the content of Pb is large, the hot workability deteriorates, and in addition, the toughness of the nitrided component also deteriorates. Therefore, if Pb is contained, the upper limit of the Pb content is set; and the content of Pb is set to 0.50% or less. When Pb is contained, the content of Pb is preferably 0.20% or less.

On the other hand, in the case where Pb is contained, in order to stably achieve the above-described effect of Pb, it is preferable that the content of Pb be 0.02% or more.

Ca: 0.010% or Less

Ca (calcium) has an action for improving the machinability. Therefore, in order to achieve the above effect, Ca can be contained. However, in the case where the content of Ca is large, the hot workability deteriorates, and in addition, the toughness of the nitrided component also deteriorates.

Therefore, if Ca is contained, the upper limit of the Ca content is set; and the content of Ca is set to 0.010% or less. When Ca is contained, the content of Ca is preferably 0.005% or less.

On the other hand, in the case where Ca is contained, in order to stably achieve the above-described effect of Ca, it is preferable that the content of Ca be 0.0003% or more.

Bi: 0.30% or less

Bi (bismuth) also has an action for improving the machinability. Therefore, in order to achieve the above effect, Bi can be contained. However, in the case where the content of Bi is large, the hot workability deteriorates, and in addition, the toughness of the nitrided component also deteriorates. Therefore, if Bi is contained, the upper limit of the Bi content is set; and the content of Bi is set to 0.30% or less. When Bi is contained, the content of Bi is preferably 0.10% or less.

On the other hand, in the case where Bi is contained, in order to stably achieve the above-described effect of Bi, it is preferable that the content of Bi be 0.005% or more.

Te: 0.30% or less

Te (tellurium) has an action for improving the machinability. Therefore, in order to achieve the above effect, Te can be contained. However, in the case where the content of Te is large, the hot workability deteriorates, and in addition, the toughness of the nitrided component also deteriorates. Therefore, if Te is contained, the upper limit of the Te content is set; and the content of Te is set to 0.30% or less. When Te is contained, the content of Te is preferably 0.10% or less.

On the other hand, in the case where Te is contained, in order to stably achieve the above-described effect of Te, it is preferable that the content of Te be 0.003% or more.

Se: 0.30% or Less

Se (selenium) also has an action for improving the machinability. Therefore, in order to achieve the above effect, Se can be contained. However, in the case where the content of Se is large, the hot workability deteriorates, and in addition, the toughness of the nitrided component also deteriorates. Therefore, if Se is contained, the upper limit of the Se content is set; and the content of Se is set to 0.30% or less. When Se is contained, the content of Se is preferably 0.10% or less.

On the other hand, in the case where Se is contained, in order to stably achieve the above-described effect of Se, it is preferable that the content of Se be 0.005% or more.

Sb: 0.30% or Less

Sb (antimony) has an action for improving the machinability. Therefore, in order to achieve the above effect, Sb can be contained. However, in the case where the content of Sb is large, the hot workability deteriorates, and in addition, the toughness of the nitrided component also deteriorates; Therefore, if Sb is contained, the upper limit of the Sb content is set; and the content of Sb is set to 0.30% or less. When Sb is contained, the content of Sb is preferably 0.10% or less.

On the other hand, in the case where Sb is contained, in order to stably achieve the above-described effect of Sb, it is preferable that the content of Sb be 0.005% or more.

With regard to the aforementioned Pb, Ca, Bi, Te, Se and Sb, only one or a combination of two or more elements can be contained. The total amount in the case where these elements are contained compositely is preferably 0.50% or less, and more preferably 0.30% or less.

Fn1: 20 to 80

With regard to the steel material for nitriding of the present invention, the Fn1 expressed by the following formula (1) must be 20 to 80;

$$Fn1=(669.3 \times \log_e C - 1959.6 \times \log_e N - 6983.3) \times (0.067 \times Mo + 0.147 \times V) \quad (1);$$

wherein each symbol C, N, Mo and V represents the content by mass percent of the element concerned.

The above Fn1 is a parameter serving as an index of the amount of age hardening caused by nitriding, that is to say, allowance of improvement in the core hardness caused by nitriding. When the Fn1 is 20 or more, the amount of age hardening after nitriding becomes large, and thereby the core hardness increases. However, if the Fn1 exceeds 80, the above-described effect is saturated. The Fn1 is preferably 30 or more.

Fn2: 160 or More

With regard to the steel material for nitriding of the present invention, the Fn2 expressed by the following formula (2) must be 160 or more;

$$Fn2 = 140 \times Cr + 125 \times Al + 235 \times V \quad (2);$$

wherein each symbol Cr, Al and V represents the content by mass percent of the element concerned.

The above Fn2 is a parameter serving as an index of the surface hardness, bending fatigue strength, and wear resistance after nitriding.

All of Cr, Al and V produce hard nitrides and carbonitrides near the surface of the nitrided component during nitriding treatment, and thereby they can increase the surface hardness. By making the Fn2 160 or more, the surface hardness becomes 650 or more in HV, and the bending fatigue strength and wear resistance equivalent to those of a material performed the treatment of the "carburizing and quenching" are attained. In the case where the Fn2 is less than 160, the surface hardness is low, and the bending fatigue strength and wear resistance are poor as compared with the said material performed the treatment of the "carburizing and quenching". The Fn2 is preferably 170 or more, and 300 or less.

(B) Microstructure of Steel Material and the Content of V in Precipitates Determined by the Extraction Residue Analysis:

The steel material for nitriding of the present invention is regulated so that in addition to having the chemical composition described in the above item (A), the microstructure thereof is a ferritic-pearlitic structure, a ferritic-bainitic structure, or a ferritic-pearlitic-bainitic structure, and the area fraction of ferrite is 20% or more, and further the content of V in precipitates determined by the extraction residue analysis is 0.10% or less.

With regard to the steel material for nitriding, even if the microstructure thereof is a ferritic-pearlitic structure, a ferritic-bainitic structure, or a ferritic-pearlitic-bainitic structure, if the area fraction of soft ferrite is less than 20%, the hardness is increased and the cutting resistance becomes high, and thereby a deterioration in the machinability is liable to occur. Therefore, the area fraction of ferrite in the above-mentioned microstructures is set to 20% or more. The area fraction of ferrite in the said microstructures is more preferably 30% or more. In addition, the chip disposability of the soft ferrite is poor, so that a deterioration in the machinability is liable to occur. Therefore, the area fraction of ferrite in the above-mentioned microstructures is set to 75% or less.

As already described, the "area fraction of ferrite" does not include the area fraction of ferrite which constitutes pearlite together with cementite.

With regard to the steel material for nitriding, even if the microstructure thereof is a ferritic-pearlitic structure, a ferritic-bainitic structure, or a ferritic-pearlitic-bainitic structure, and the area fraction of ferrite is 20% or more, if fine V precipitates, that is to say, the carbides, nitrides and carbo-nitrides of V, do precipitate in a large amount, the ferrite is strengthened and the hardness is increased, so that the cutting resistance becomes high and the machinability is liable to deteriorate. Therefore, in order to ensure the machinability, the content of V in precipitates determined by the extraction residue analysis is set to 0.10% or less. The content of V in precipitates is preferably 0.08% or less.

The content of V in precipitates determined by the extraction residue analysis can be determined as described below. For example, first, a proper test piece is cut off. Second, the cut-off test piece is subjected to a constant-current electrolysis in a 10% AA type solution. Third, the extracted solution is filtrated through a filter having a mesh size of 0.2 μm. Finally, the filtrated substance is subjected to a general chemical analysis. The 10% AA type solution is a solution in which tetramethylammoniumchloride, acetylacetone, and methanol are mixed in the ratio of 1:10:100.

As described above, in the case where the steel material is as-hot-rolled condition or as-hot-forged condition, the carbides, nitrides, and carbo-nitrides of V had precipitated, and thus, the machinability is insufficient. Therefore, in order to obtain the steel material for nitriding in which the microstructure thereof is a ferritic-pearlitic structure, a ferritic-bainitic structure, or a ferritic-pearlitic-bainitic structure, and the area fraction of ferrite is 20% or more, and further the content of V in precipitates determined by the extraction residue analysis is 0.10% or less, it is preferable that the steel material be "normalized"; in the concrete, the steel material be heated to a temperature of, for example, 850 to 950° C. after hot rolling or/and hot forging, and thereafter be cooled to room temperature by a forced air cooling.

After being carried out the heating treatment in the temperature range mentioned above, if the steel material is "normalized" by being cooled to room temperature with an atmospheric cooling or a slow cooling, the carbides, nitrides, and carbo-nitrides of V do precipitate again in the cooling process, so that the hardness increases and, in some cases, the machinability deteriorates. Therefore, in order to prevent the carbides, nitrides, and carbo-nitrides of V from precipitating, after being heated, the steel material is preferably cooled by a forced air cooling such that the average cooling rate in the temperature range of, for example, 800 to 500° C. is 0.5 to 5.0° C./second.

(C) Nitrided Component:

The nitrided component of the present invention must be such that, in addition to having the chemical composition described in the above item (A), the core hardness thereof is 180 or more in HV, the surface hardness thereof is 650 or more in HV, and the effective case depth thereof is 0.20 mm or more.

In the case where the above conditions are met, the nitrided component is excellent in deformation resistance, bending fatigue strength, and wear resistance; and thus it can be used suitably as a component for machine structural use that is used for an automobile transmission and the like, such as a gear and a pulley for a CVT.

The core hardness is preferably 200 or more, and 350 or less in HV. The surface hardness is preferably 670 or more, and 900 or less in HV. The effective case depth is preferably 0.25 mm or more, and 0.50 mm or less.

(D) Method for Producing the Nitrided Component:

For example, the nitrided component described in the above item (C) can be manufactured by subjecting the steel material for nitriding having the chemical composition described in the above item (A), the microstructure described in the above item (B), and the content of V in precipitates determined by the extraction residue analysis described in the above item (B), to hor forging and/or cutting to form a component shape, and thereafter by subjecting the steel material to nitriding at a temperature of 400 to 650° C. for 1 to 30 hours.

After the processing to form the component shape, in order to make the most of the strengthening due to age hardening, it is preferable to carry out nitriding at a temperature of 400 to 650° C. for 1 to 30 hours.

In the case where the nitriding temperature is low and is less than 400° C., although a high surface hardness can be given to the nitrided component, the effective case depth is shallow, and in addition, it is difficult to achieve the increase in core hardness due to age hardening. On the other hand, in the case where the nitriding temperature is high and exceeds 650° C., although the effective case depth of the nitrided component is deep, the surface hardness decreases, and in addition, the core hardness also decreases. The nitriding temperature is preferably 450° C. or more, and 630° C. or less.

Although the nitriding time is changed depending on the effective case depth which is required for the nitrided component, in the case where the nitriding time is less than 1 hour, the effective case depth becomes shallow. On the other hand, in the case where the nitriding time is long and exceeds 30 hours, the nitrided component is unsuitable for mass production. The nitriding time is preferably 1 hour or more, and 20 hours or less.

The method of nitriding for obtaining the nitrided component of the present invention is not regulated especially, and gas nitriding, salt bath nitriding, ion nitriding and the like can be used. In nitrocarburizing, for example, an RX gas is used together with $NH_3$, and the treatment can be carried out in an atmosphere in which $NH_3$ and the RX gas are in the ratio of 1:1.

Although the nitriding time differs depending on the treatment temperature, for example, when nitrocarburizing is carried out at 590° C., nitriding time of 9 hours can provide the surface hardness, core hardness, and effective case depth described in the above item (C).

In addition, when it is desired to restrain the occurrence of brittle compounds, it is preferable to use fluorine gas in the pretreatment of nitriding due to $NH_3$, or to use mixed gas of $NH_3$ and $H_2$ as the gas for nitriding.

The following examples, which were carried out by gas nitrocarburizing, illustrate the present invention more specifically. These examples are, however, by no means limited the scope of the present invention.

EXAMPLES

The steels 1 to 19 having the chemical compositions shown in Table 1 were melted by using a 180 kg vacuum melting furnace and cast to ingots.

The steels 1 to 13 and 19 shown in Table 1 are steels with chemical compositions being within the range regulated by the present invention. On the other hand, the steels 14 to 18 are steels of comparative examples with chemical compositions being out of the range regulated by the present invention. Note that, with respect to Mo and V in the Fn1 expressed by the formula (1) and V in the Fn2 expressed by the formula (2), each symbol "-" in Table 1 indicates "0 (zero)".

Among the steels of comparative examples mentioned above, the steel 14 is a steel corresponding to the SCr420H specified in JIS G 4052 (2008).

be the test plane. Thereafter the above embedded steel bar was polished so that the cut plane was mirror-like finished, in order to prepare a test piece for measurement of Vickers hardness before nitriding and for observation of microstructure.

In addition, with regard to each of the steels, a specimen measuring 10 mm×10 mm×10 mm was cut off from the R/2

TABLE 1

| | Chemical composition (% by mass) Balance: Fe and impurities | | | | | | | | | | | | | | | | |
|---|---|---|---|---|---|---|---|---|---|---|---|---|---|---|---|---|---|
| Steel | C | Si | Mn | P | S | Cu | Ni | Cr | Mo | Al | V | N | O | Others | Fn1 | Fn2 |
| 1 | 0.18 | 0.08 | 0.90 | 0.008 | 0.012 | — | — | 1.21 | — | 0.035 | 0.18 | 0.0057 | 0.0012 | Zr: 0.048, Te: 0.0025 | 53 | 216 |
| 2 | 0.16 | 0.09 | 0.62 | 0.009 | 0.009 | — | — | 0.92 | 0.08 | 0.028 | 0.13 | 0.0060 | 0.0013 | — | 44 | 163 |
| 3 | 0.16 | 0.09 | 0.84 | 0.009 | 0.020 | — | — | 0.91 | 0.07 | 0.031 | 0.14 | 0.0055 | 0.0012 | Pb: 0.05, Ca: 0.0014 | 50 | 164 |
| 4 | 0.16 | 0.08 | 1.21 | 0.008 | 0.025 | 0.12 | 0.09 | 1.22 | — | 0.028 | 0.15 | 0.0056 | 0.0011 | — | 43 | 210 |
| 5 | 0.19 | 0.10 | 0.98 | 0.010 | 0.015 | — | — | 1.01 | — | 0.027 | 0.21 | 0.0059 | 0.0009 | Se: 0.11, Sb: 0.11 | 61 | 194 |
| 6 | 0.18 | 0.07 | 0.98 | 0.008 | 0.013 | — | — | 1.32 | — | 0.028 | 0.25 | 0.0062 | 0.0011 | — | 67 | 247 |
| 7 | 0.30 | 0.08 | 0.32 | 0.009 | 0.015 | — | — | 0.95 | — | 0.022 | 0.14 | 0.0058 | 0.0014 | — | 47 | 169 |
| 8 | 0.31 | 0.08 | 0.51 | 0.010 | 0.009 | — | — | 0.94 | — | 0.032 | 0.14 | 0.0055 | 0.0011 | — | 50 | 169 |
| 9 | 0.29 | 0.09 | 0.62 | 0.011 | 0.011 | — | — | 0.85 | — | 0.025 | 0.19 | 0.0059 | 0.0013 | Nb: 0.035, Bi: 0.048 | 63 | 167 |
| 10 | 0.25 | 0.08 | 1.30 | 0.009 | 0.011 | — | 0.15 | 0.92 | — | 0.025 | 0.21 | 0.0055 | 0.0009 | — | 71 | 181 |
| 11 | 0.16 | 0.09 | 1.51 | 0.008 | 0.014 | — | — | 0.81 | — | 0.031 | 0.20 | 0.0050 | 0.0014 | Ti: 0.10 | 64 | 164 |
| 12 | 0.17 | 0.08 | 0.72 | 0.009 | 0.008 | — | — | 1.61 | — | 0.031 | 0.17 | 0.0054 | 0.0009 | — | 52 | 269 |
| 13 | 0.20 | 0.09 | 0.32 | 0.011 | 0.009 | — | — | 0.92 | — | 0.029 | 0.37 | 0.0079 | 0.0015 | — | 78 | 219 |
| 14 | 0.21 | 0.19 | 0.82 | 0.015 | 0.023 | — | — | 0.99 | — | 0.015 | * — | 0.0072 | 0.0021 | — | * 0 | * 140 |
| 15 | 0.28 | 0.09 | 1.70 | 0.014 | 0.023 | — | — | 1.56 | 0.08 | 0.017 | 0.40 | 0.0078 | 0.0022 | — | * 108 | 315 |
| 16 | 0.16 | 0.05 | 0.32 | 0.009 | 0.011 | 0.05 | 0.06 | 1.12 | — | 0.040 | 0.10 | 0.0078 | 0.0011 | — | * 19 | 185 |
| 17 | 0.17 | 0.05 | 0.32 | 0.009 | 0.011 | 0.15 | — | 0.81 | 0.07 | 0.012 | 0.12 | 0.0052 | 0.0011 | — | 48 | * 143 |
| 18 | *0.12 | 0.08 | 0.34 | 0.009 | 0.032 | — | — | 0.85 | — | 0.058 | 0.13 | 0.0048 | 0.0018 | — | 39 | * 157 |
| 19 | 0.16 | 0.07 | 0.77 | 0.008 | 0.033 | — | — | 1.10 | — | 0.050 | 0.11 | 0.0053 | 0.0019 | — | 33 | 186 |

Fn1 = (669.3 × $\log_e$C − 1959.6 × $\log_e$N − 6983.3) × (0.067 × Mo + 0.147 × V)
Fn2 = 140 × Cr + 125 × Al + 235 × V
The mark "*" indicates falling outside the conditions regulated by the present invention.

Each ingot was subjected to the homogenizing treatment by being held at 1250° C. for 5 hours, and thereafter was hot forged to prepare both a steel bar having a diameter of 35 mm and a length of 1000 mm and a steel bar having a diameter of 45 mm and a length of 1000 mm.

Among the steel bars mentioned above, the steel bars of the steels 1 to 13 and 16 to 18 were "normalized" by being held at 950° C. for 1 hour and thereafter by being cooled to room temperature by a forced air cooling. As a result of measurement made by inserting a thermocouple in the steel bar, it was revealed that the average cooling rate in the temperature range of 800 to 500° C. of each forced air cooling was 1.48° C./second in the R/2 portion ("R" represents a radius of the steel bar) of the steel bar having the diameter of 35 mm, and 0.78° C./second in the R/2 portion of the steel bar having the diameter of 45 mm.

The steel bars of the steels 14 and 15 containing no V were "normalized" by being held at 920° C. for 1 hour and thereafter by being cooled to room temperature by an atmospheric cooling.

The steel bars of the steel 19 were "quenched" by being held at 950° C. for 1 hour and thereafter being cooled to room temperature by an oil cooling.

With regard to each of the steels, various types of test pieces were cut off from a part of the steel bar having the diameter of 35 mm after the heat treatment described above.

In the concrete, with regard to each of the steels, the heat treated steel bar having the diameter of 35 mm was "cut transversely", that is to say, was cut perpendicularly to the axial direction (the longitudinal direction). Next, the cut steel bar was embedded in a resin so that the cut plane did portion of the heat treated steel bar having the diameter of 35 mm, in order to carry out the extraction residue analysis.

Furthermore, with regard to each of the steels, in order to measure the hardness and so on after nitriding, a round bar test piece having a diameter of 10 mm shown in FIG. 1 was cut off from the central portion of the heat treated steel bar having the diameter of 35 mm in parallel to the axial direction thereof. In addition, with regard to each of the steels, a notched Ono type rotating bending fatigue test piece having the rough shape shown in FIG. 2 was cut off from the central portion of the heat treated steel bar having the diameter of 35 mm in parallel to the axial direction thereof.

Figure 3:
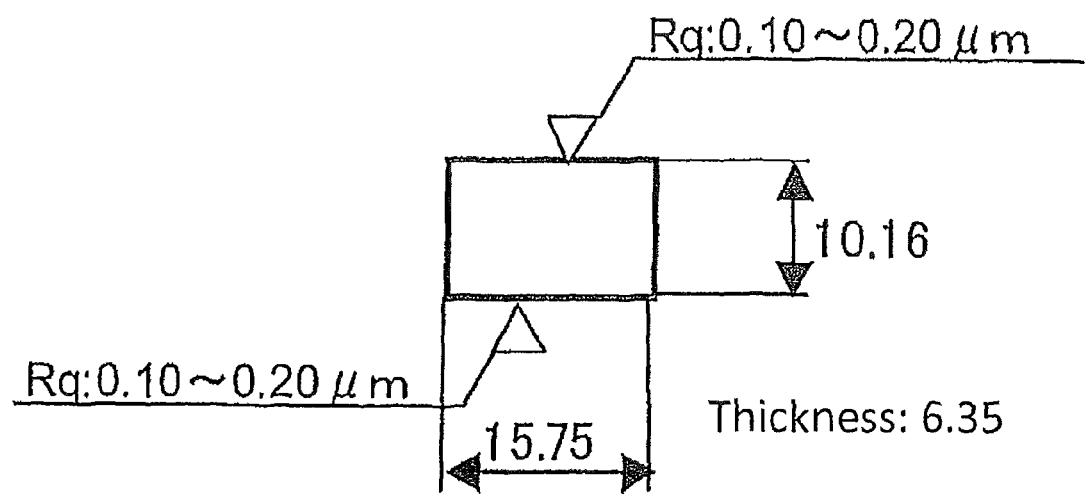
FIG. 3 is a view showing a shape of a block test piece A for investigating wear resistance used in the EXAMPLES. The units of the dimensions that units are not indicated in this figure are "mm".
Figure 4:
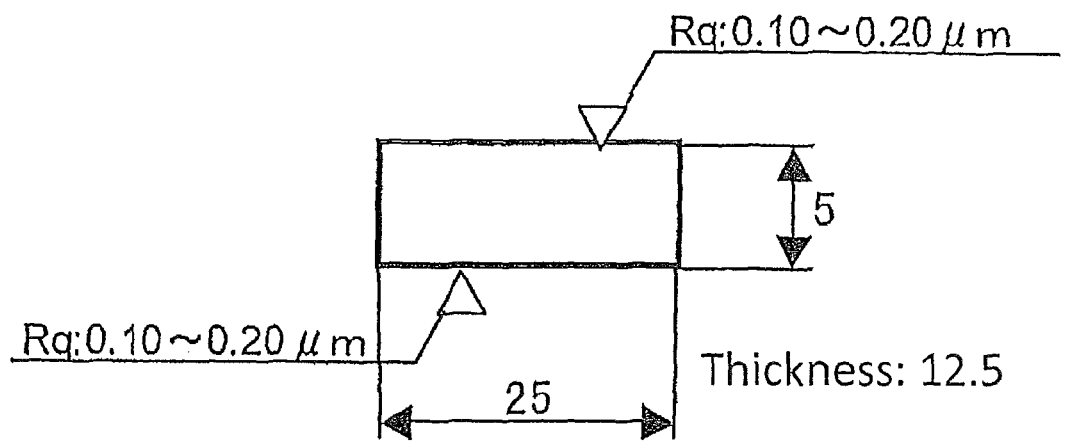
FIG. 4 is a view showing a shape of a block test piece B for investigating deformation resistance used in the EXAMPLES. The units of the dimensions that units are not indicated in this figure are "mm".

Similarly, from the central portion of the heat treated steel bar having the diameter of 35 mm, in parallel to the axial direction thereof, a block test specimen measuring 15.75 mm long, 10.16 mm wide, and 6.35 mm thick (hereinafter, referred to the "block test specimen A") shown in FIG. 3 and a block test specimen measuring 25 mm long, 5 mm wide, and 12.5 mm thick (hereinafter, referred to the "block test specimen B") shown in FIG. 4 were cut off.

Except for the symbols "3.2S", the units of the dimensions that units are not indicated in the above cut-off test pieces shown in FIGS. 1 to 4 are "mm". The inverted triangular finish marks of two kinds shown in the figures are the "triangular symbols" designating surface roughness described in Explanation Table 1 of JIS B 0601 (1982).

Figure 2:
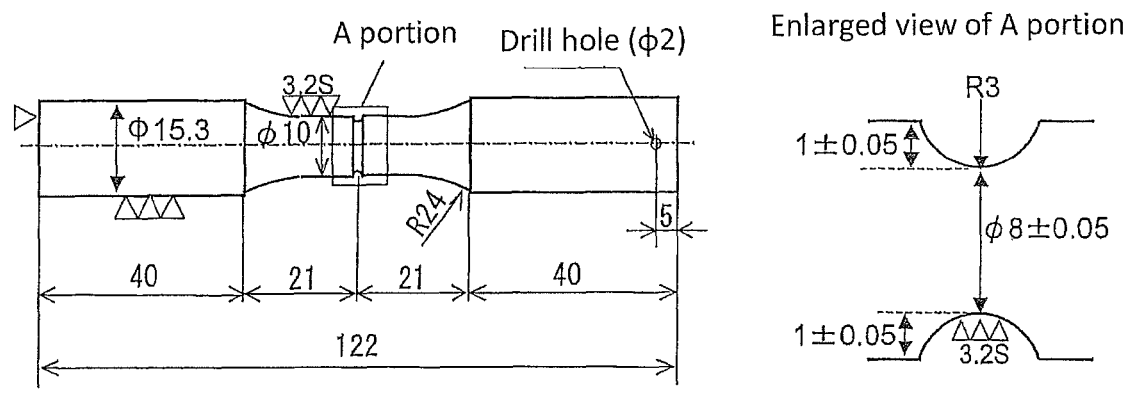
FIG. 2 is a view showing a rough shape of a notched Ono type rotating bending fatigue test piece as cut off condition from a cold drawn material used in the EXAMPLES. In this figure, except for the symbols "3.2S", the units of the dimensions are "mm".

The symbols "3.2S" described with the finish marks in FIG. 2 mean that the maximum height Rmax is 3.2 μm or less. In addition, the indications of "Rq: 0.10 to 0.20 μm" described with the finish marks in FIGS. 3 and 4 mean that the root-mean-square roughness "Rq" specified in JIS B 0601 (2001) is 0.10 to 0.20 μm.

On the other hand, the heat treated steel bar having the diameter of 45 mm was peeled to a diameter of 40 mm, and thereafter the said steel bar was cut to a length of 300 mm in order to prepare a test piece for investigation of machinability.

Figure 5:
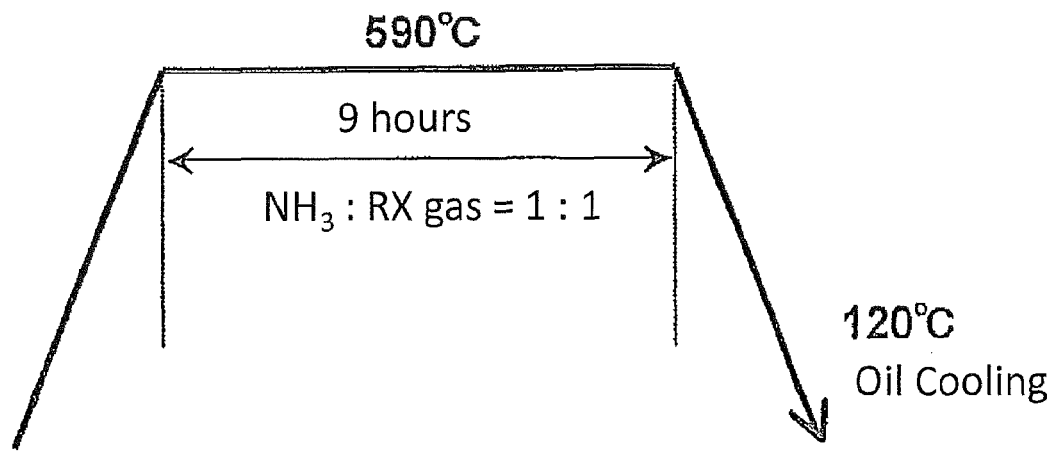
FIG. 5 is a diagram showing the heat pattern of nitrocarburizing carried out on the test pieces shown in FIGS. 1 to 4 in the EXAMPLES.

The thus prepared test pieces, which are the round bar test pieces having a diameter of 10 mm for measuring hardness and so on after nitriding, the notched Ono type rotating bending fatigue test pieces having the rough shape, the block test pieces A, and the block test pieces B, were treated by nitriding. In the concrete, the "gas nitrocarburizing" using the heat pattern shown in FIG. 5 was carried out. Incidentally, the "120° C. Oil Cooling" means that the test pieces were cooled by being put in the oil having a temperature of 120° C.

Figure 6:
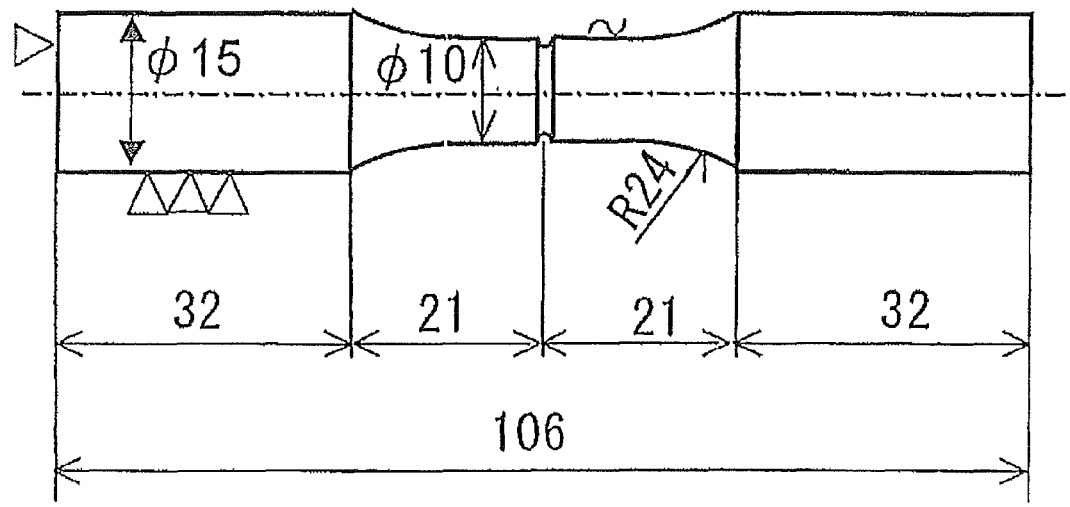
FIG. 6 is a view showing a finished shape of a notched Ono type rotating bending fatigue test piece used in the EXAMPLES. In this figure, the units of the dimensions are "mm".

The aforementioned notched Ono type rotating bending fatigue test pieces having the rough shape subjected to the "gas nitrocarburizing" were finished to prepare the notched Ono type rotating bending fatigue test pieces shown in FIG. 6.

The units of the dimensions in the notched Ono type rotating bending fatigue test piece shown in FIG. 6 are "mm", and similarly in the above FIGS. 1 to 4, the inverted triangular finish marks of two kinds shown in FIG. 6 are the "triangular symbols" designating surface roughness described in Explanation Table 1 of JIS B 0601 (1982).

The "~ (wave dash)", which is "waveform symbol", in FIG. 6 means that the surface is not carried out a removal treatment, that is to say, the surface is "as-gas nitrocarburized condition".

By using the thus prepared test pieces, the tests described below were carried out.

Investigation 1: Vickers Hardness Test Before Nitriding

Being based on the "Vickers hardness test—Test method" described in JIS Z 2244 (2009), at a total of 5 points of 1 point in the central portion of the mirror-like finished each test piece for measurement of Vickers hardness before nitriding and 4 points in the R/2 portion thereof, Vickers hardness was measured by using a Vickers hardness tester with the testing force being 9.8N; and the arithmetic mean value of the said 5 points was defined as the hardness before nitriding.

Investigation 2: Microstructure Observation Before Nitriding

The mirror-like finished test pieces for observation of microstructure before nitriding were etched with nital, and thereafter in order to identify the "phase", 5 fields of the R/2 portion thereof were observed using an optical microscope at a magnification of 400 times. In addition, from the obtained microstructure photographs, the area fraction of ferrite in each field was calculated by using an image analysis software, and the arithmetic mean value of the said 5 fields was defined as the area fraction of ferrite.

Investigation 3: Extraction Residue Analysis Before Nitriding

The specimens measuring 10 mm×10 mm×10 mm, which were cut off in order to carry out the extraction residue analysis, were electrolyzed at a constant current in a 10% AA type solution. That is to say, in order to remove the accretions on the surface, first, pre-electrolysis was carried out on the specimen under the conditions of electric current: 1000 mA and time: 28 minutes. Thereafter, the accretions on the surface of the specimen were ultrasonically cleaned in alcohol and were removed from the specimen; and further, the mass of the specimen from which accretions had been removed was measured. The thus measured mass was defined as the mass of the specimen before the electrolysis being carried out in the next process.

Next, the specimen was electrolyzed under the conditions of electric current: 173 mA and time: 142 minutes. The thus electrolyzed specimen was taken out, and then, the accretions (residues) on the surface of the specimen were ultrasonically cleaned in alcohol and were removed from the specimen. Thereafter, in order to sample the residues, both the solution after the electrolysis and the solution having been used for ultrasonic cleaning were suction-filtrated through a filter having a mesh size of 0.2 μm; and then, the mass of the specimen from which accretions (residues) had been removed was measured, and the thus measured mass was defined as the mass of the specimen after the electrolysis. From the difference between measured values of specimen masses before and after the electrolysis, the "mass of the electrolyzed portion of the specimen" was determined.

The residues sampled on the filter were shifted onto a petri dish and were dried, and after the mass had been measured, the residues were subjected to an acidolysis treatment.

The solution subjected to the above acidolysis was analyzed by using an ICP emission analyzer (high-frequency inductively coupled plasma emission spectrophotometer) to determine the "mass of V in residues".

With regard to each of the steels, a value that was obtained by dividing the thus obtained "mass of V in residues" by the said "mass of the electrolyzed portion of the specimen", and by being represented in percentage was defined as the "content of V in precipitates determined by the extraction residue analysis".

Investigation 4: Machinability Test

Using an NC lathe, the machinability was investigated by turning the outer circumference portion of a test piece that had been peeled so as to have a diameter of 40 mm and thereafter had been cut to a length of 300 mm.

The above turning was carried out by using a cemented carbide tool consisting mainly of WC, not provided with a chip breaker, under the conditions of cutting speed: 150 m/min, depth of cut: 0.2 mm, and feed rate: 0.8 mm/rev, and in the state of being lubricated with a water-soluble lubricant. The machinability was evaluated by the cutting resistance measured by a cutting dynamometer at the time of turning and the chip disposability.

The cutting resistance was evaluated by determining the resultant force of main cutting force component, feed cutting force component, and thrust cutting force component by the following formula;

$$\text{Cutting resistance} = \{(\text{main cutting force component})^2 + (\text{feed cutting force component})^2 + (\text{thrust cutting force component})^2\}^{0.5}.$$

In the case where the thus evaluated cutting resistance was 650N or less, the cutting force was supposed to be small, and so this value was defined as the target.

Figure 7:
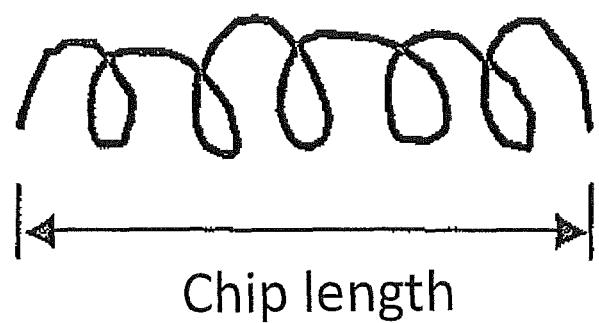
FIG. 7 is a view for explaining the length of a chip produced by turning using an NC lathe in the EXAMPLES.

The chip disposability was evaluated as described below. With regard to each of the steels, from optional 10 chips after turning, a chip in which the chip length shown in FIG. 7 was at a maximum was selected, and in order to evaluate the chip disposability, the length thereof was measured. The chip disposability was evaluated as "Excellent (oo)", "Good (o)", and "Poor (x)" in the case where the chip length was not more than 5 mm, in the case where it was more than 5 mm and not more than 10 mm, and in the case where it was more than 10 mm, respectively.

The chip disposability evaluated as Excellent or Good (oo or o) was defined as the target.

Investigation 5: Measurement of the Core Hardness, Surface Hardness, and Effective Case Depth after Nitriding The round bar test piece having a diameter of 10 mm which had been subjected to the said gas nitrocarburizing was cut transversely. Next, the cut round bar test piece was embedded in a resin so that the cut plane did be the test plane. Thereafter the cut round bar test piece was polished so that the cut plane was mirror-like finished, and the core hardness was measured using a Vickers hardness tester. In addition, by using a micro-Vickers tester, the surface hardness and the effective case depth were investigated.

In the concrete, being based on JIS Z 2244 (2009), at a total of 5 points of 1 point in the central portion of the mirror-like finished test piece and 4 points in the R/2 portion thereof, Vickers hardness was measured by using the Vickers hardness tester with the testing force being 9.8N, and the arithmetic mean value of the said 5 points was defined as the "core hardness".

Similarly in the above-described case, being based on JIS Z 2244 (2009), by using the same embedded test piece, at optional 10 points at a position 0.01 mm deep from the surface of each test piece, HV was measured by using the micro-Vickers tester with the testing force being 0.98N, and the arithmetic mean value of the ten points was defined as the "surface hardness".

Furthermore, by using the same embedded test piece, being based on JIS Z 2244 (2009), HV were measured successively from the surface of the mirror-like finished test piece by using the micro-Vickers tester with the testing force being 1.96N, and the hardness distribution map was prepared. The distance from the surface to the position at which HV did be 550 was defined as the "effective case depth".

Investigation 6: Ono Type Rotating Bending Fatigue Test

By using Ono type rotating bending fatigue test pieces having been finished after the said gas nitrocarburizing, the Ono type rotating bending fatigue test was carried out under the test conditions described below, and the maximum strength at which the test piece did not rupture in the number of cycles of $10^7$ was defined as the "rotating bending fatigue strength". In the case where the rotating bending fatigue strength was 400 MPa or more, the thus defined rotating bending fatigue strength was supposed to be excellent, and so this value was defined as the target.

Temperature: room temperature,
Atmosphere: in the air,
Number of revolutions: 3000 rpm.

Investigation 7: Investigation of the Wear Resistance

Figure 8:
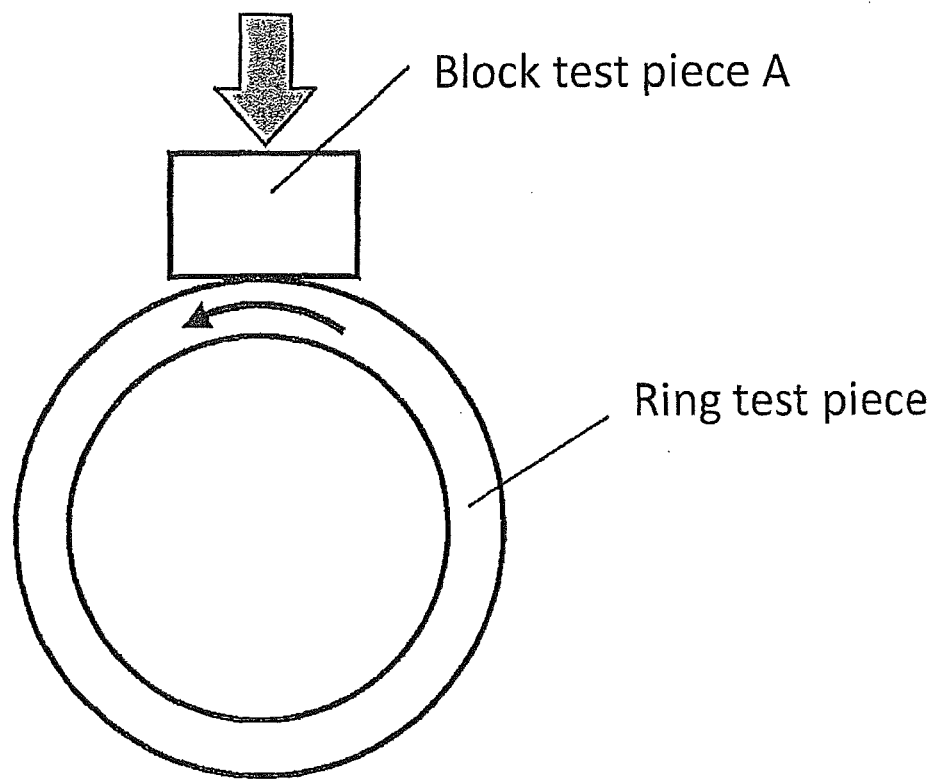
FIG. 8 is a view for explaining a method for a block-on-ring wear test carried out in the EXAMPLES.

The wear resistance was investigated by the block-on-ring wear test. That is to say, as shown in FIG. 8, the plane having a length of 15.75 mm and a thickness of 6.35 mm (hereinafter, referred to as the "test plane") of the said gas nitrocarburized block test piece A was pushed against a ring test piece, and the said ring test piece was rotated, whereby the wear test was carried out.

In the concrete, 100 milliliters of a commercial automatic transmission oil was put in a test chamber as a lubricating oil, the temperature thereof being raised to 90° C., thereafter the test plane of the block test piece A was pushed against the ring test piece with a testing force of 1000N, and the ring test piece was rotated until the total slipping distance became 8000 m with the slipping velocity being 0.1 m/second.

The above ring test piece was prepared as described below. From a steel bar having a diameter of 45 mm of SCM420 specified in JIS G 4053 (2008), a test piece approximately having the shape shown in FIG. 9 was cut off with the axial direction thereof being aligned with the steel bar, and the said cut-off test piece was subjected to the gas "carburizing and quenching" and tempering with the heat patterns shown in FIG. 10, thereafter the outer circumference portion thereof being ground by 100 μm, and thereby the test piece was finished to the size and shape shown in FIG. 9.

Figure 9:
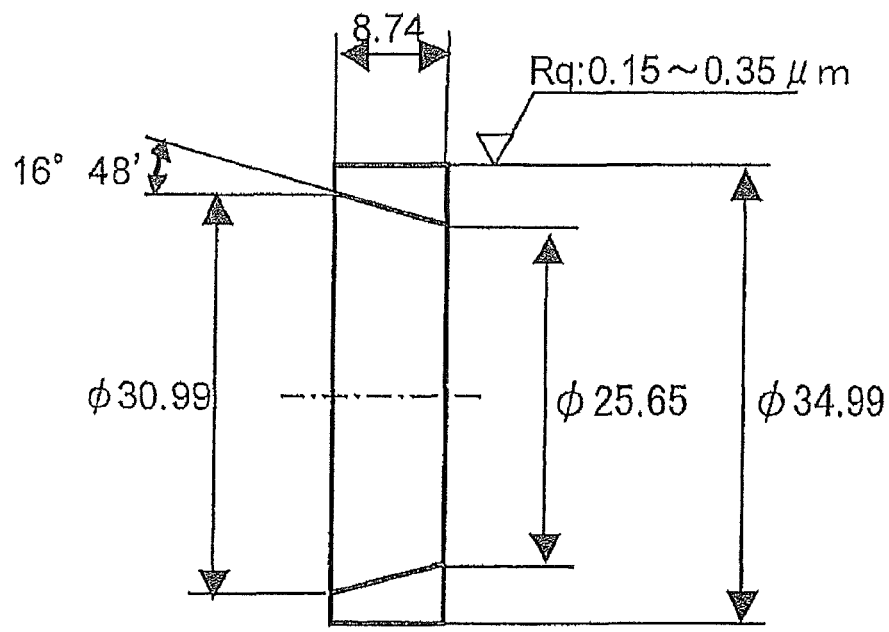
FIG. 9 is a view showing a shape of a ring test piece used for the block-on-ring wear test in the EXAMPLES. The units of the dimensions that units are not indicated in this figure are "mm".

The units of the dimensions that units are not indicated in the above ring test piece shown in FIG. 9 are "mm", and the inverted triangular finish mark shown in the said FIG. 9 is the "triangular symbol" designating surface roughness described in Explanation Table 1 of JIS B 0601 (1982). In addition, the "Rq: 0.15 to 0.35 μm" attached to the triangular symbol means that the root-mean-square roughness "Rq" specified in JIS B 0601 (2001) is 0.15 to 0.35 μm.

Figure 10:
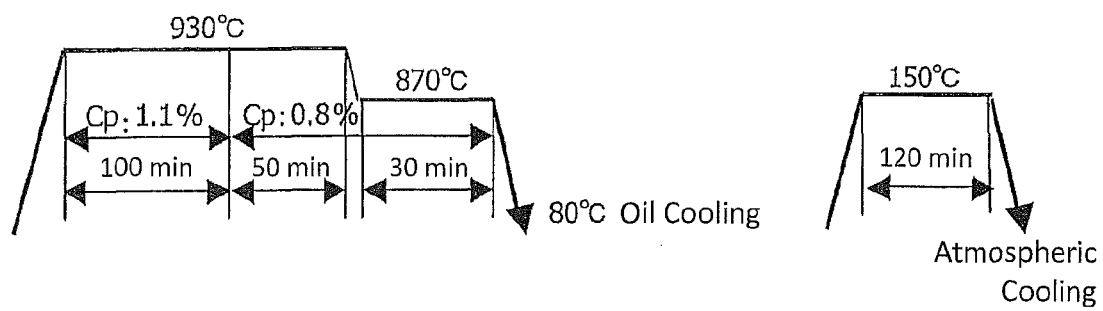
FIG. 10 are diagrams showing the heat patterns of gas "carburizing and quenching" and tempering carried out on the ring test piece and the indentation test jig before finish grinding in the EXAMPLES.

The "Cp" in FIG. 10 represents carbon potential. In addition, the "80° C. Oil Cooling" means that the ring test piece was cooled by being put in the oil having a temperature of 80° C.

Figure 11:
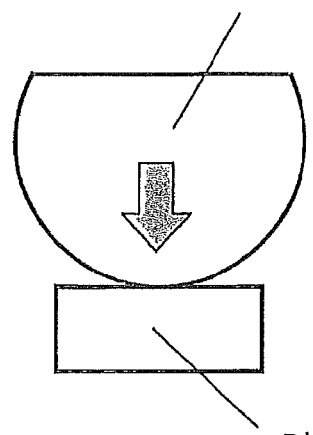
FIG. 11 is a view for explaining a method for measuring a wear depth after the block-on-ring wear test carried out in the EXAMPLES.
Figure 11:
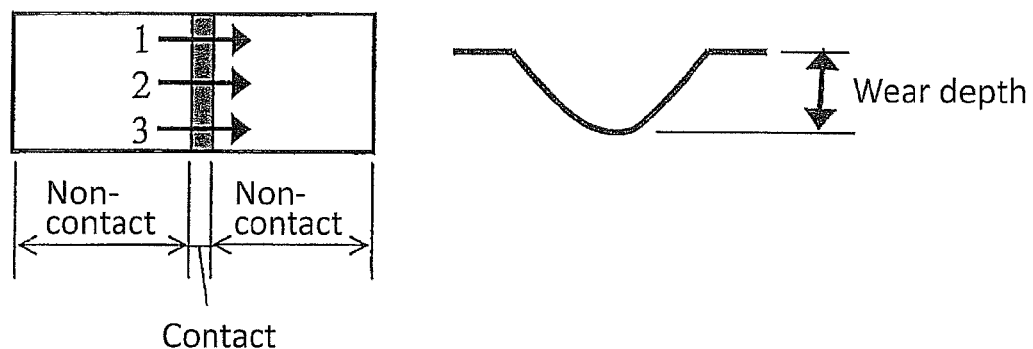

After the finish of the said block-on-ring wear test, by using a surface roughness tester, the surface roughness of the test plane of the block test piece A was measured continuously in the order of non-contact portion, contact portion, and non-contact portion as indicated by arrow marks 1, 2, and 3 in FIG. 11. And then, in the obtained each cross-sectional curve, the largest difference between the non-contact portion and the contact portion was defined as an each wear depth. With regard to the each block test piece A, three wear depths were determined, and the mean value thereof was defined as the wear depth. In the case where the thus defined wear depth was 10.0 μm or less, the wear resistance was supposed to be excellent, and so this value was defined as the target.

The "non-contact portion" and "contact portion" mentioned above means the "non-contact portion" and "contact portion" with the ring test piece.

Investigation 8: Investigation of the Deformation Resistance

Figure 12:
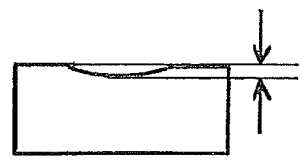
FIG. 12 is a view for explaining a method for an indentation test carried out in the EXAMPLES.

The deformation resistance was investigated by an indentation test. That is to say, as shown in FIG. 12, an indentation test jig having the shape shown in FIG. 13 was pushed into the plane having a length of 25 mm and a thickness of 12.5 mm (hereinafter, referred to as the "test plane") of the said gas nitrocarburized block test piece B, whereby the deformation resistance was investigated. The said indentation test jig was prepared as described below like the ring test piece for the block-on-ring wear test. From a steel bar having a diameter of 45 mm of SCM420 specified in JIS G 4053 (2008), a test piece approximately having the shape shown in FIG. 13 was cut off with the axial direction thereof being aligned with the steel bar. The said cut-off test piece was subjected to the gas "carburizing and quenching" and tempering with the heat patterns shown in FIG. 10, thereafter the outer circumference portion thereof being ground by 100 μm, and thereby the test piece was finished to the size and shape shown in FIG. 13.

In the concrete, by using an oil hydraulic servo testing machine, the indentation test jig was pushed into the test plane of the block test piece B with a testing force of 5000N. After the testing force had been relieved, similarly in the Investigation 7, the indentation deformation amount in the test plane of the block test piece B was measured in three locations by using the surface roughness tester, and the mean value of three locations was defined as the indentation deformation amount. In the case where the thus defined indentation deformation amount was 6.0 μm or less, the deformation resistance was supposed to be excellent, and so this value was defined as the target.

Figure 13:
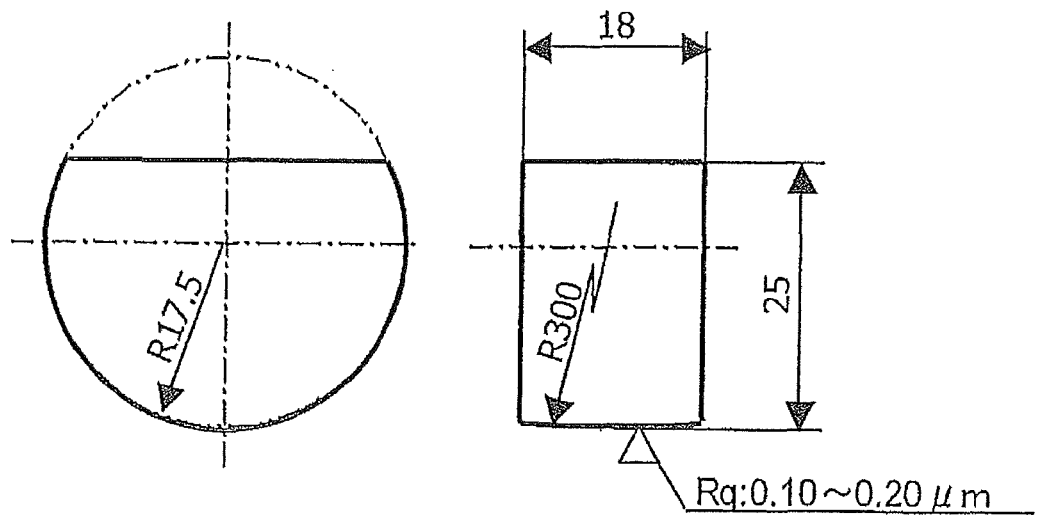
FIG. 13 is a view showing a shape of an indentation test jig used for the indentation test in the EXAMPLES. The units of the dimensions that units are not indicated in this figure are "mm".

The units of the dimensions that units are not indicated in the above indentation test jig shown in FIG. 13 are "mm", and the inverted triangular finish mark shown in the said FIG. 13 is the "triangular symbol" designating surface roughness described in Explanation Table 1 of JIS B 0601 (1982). In addition, the "Rq: 0.10 to 0.20 μm" attached to the triangular symbol means that the root-mean-square roughness "Rq" specified in JIS B 0601 (2001) is 0.10 to 0.20 μm.

The test results of the Investigations 1 to 4 are collectively shown in Table 2, and the test results of the Investigations 5 to 8 are collectively shown in Table 3. In the case where the steel 14 containing no V was used, V was not found in precipitates determined by the extraction residue analysis. Therefore, in the column of the "Content of V in precipitates" of test No. 14 in Table 2, the content of V is described as "-". In addition, in Table 3, the hardness (HV) before nitriding in the Investigation 1 is given. Furthermore, in Table 3, the difference between the core hardness (HV) after nitriding and the said hardness (HV) before nitriding is given as the age hardening amount (ΔHV) due to nitriding.

Figure 14:
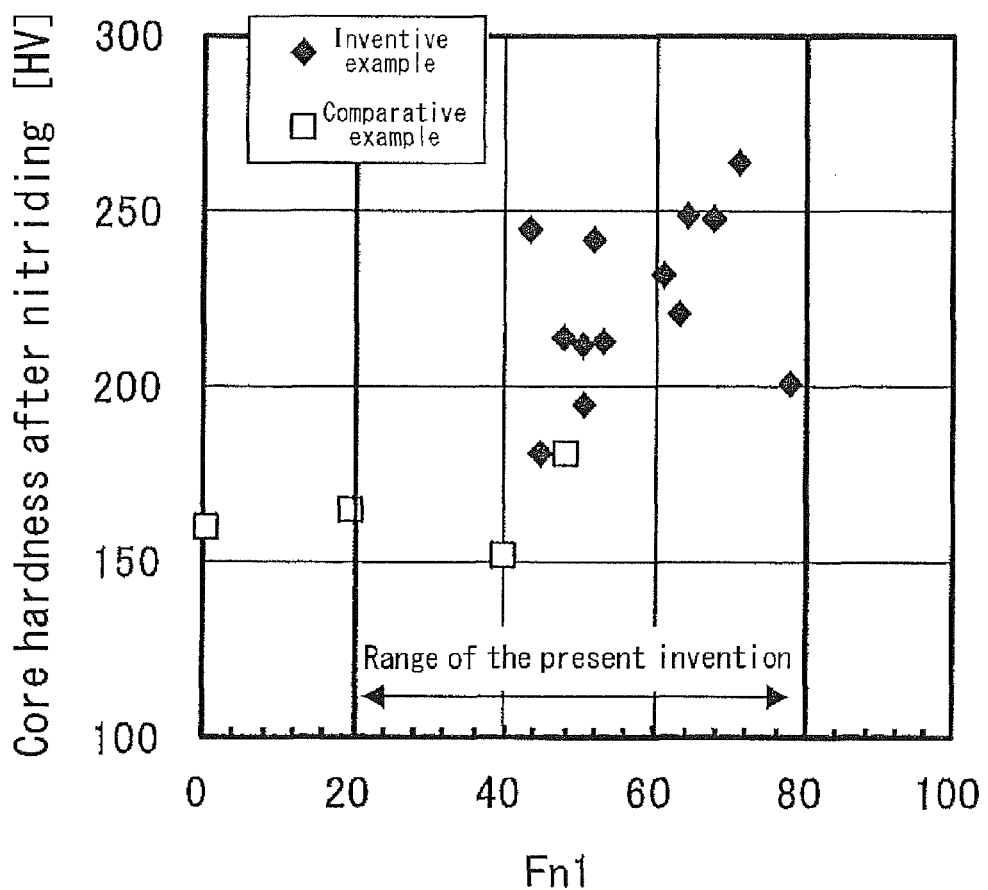
FIG. 14 is a graph summarizing the relationship between the Fn1 expressed by the formula (1) and the core hardness (HV) after nitriding in the Investigation 5 in the EXAMPLES.
Figure 15:
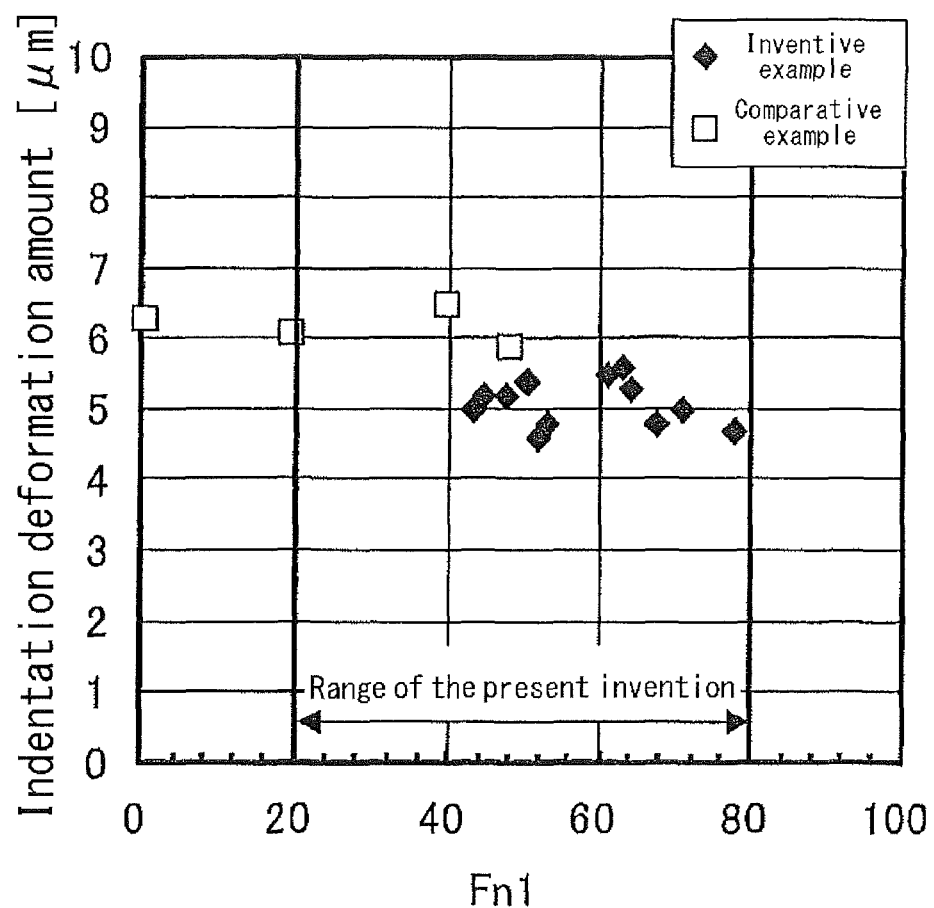
FIG. 15 is a graph summarizing the relationship between the Fn1 expressed by the formula (1) and the indentation deformation amount in the Investigation 8 in the EXAMPLES.

Among the above test results, the relationship between the Fn1 and the core hardness (HV) after nitriding in the Investigation 5 and the relationship between the Fn1 and the indentation deformation amount in the Investigation 8 are summarized in FIGS. 14 and 15, respectively.

Figure 16:
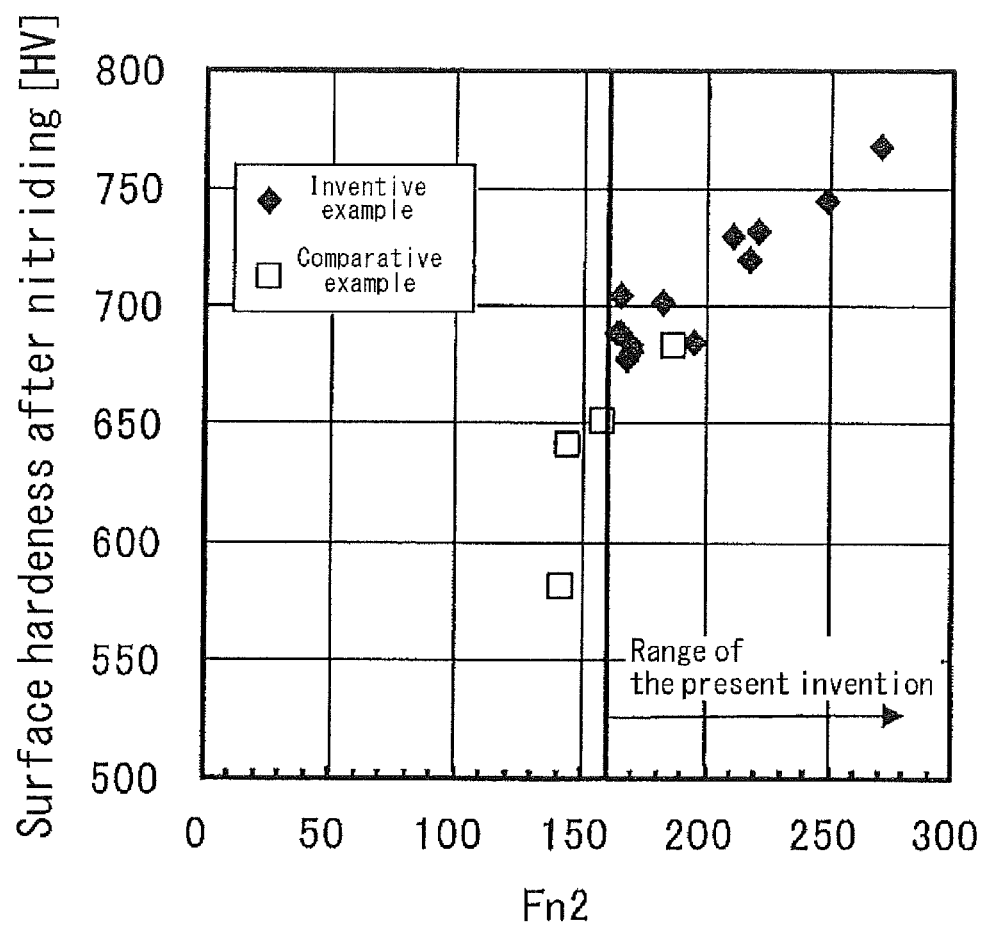
FIG. 16 is a graph summarizing the relationship between the Fn2 expressed by the formula (2) and the surface hardness (HV) after nitriding in the Investigation 5 in the EXAMPLES.
Figure 17:
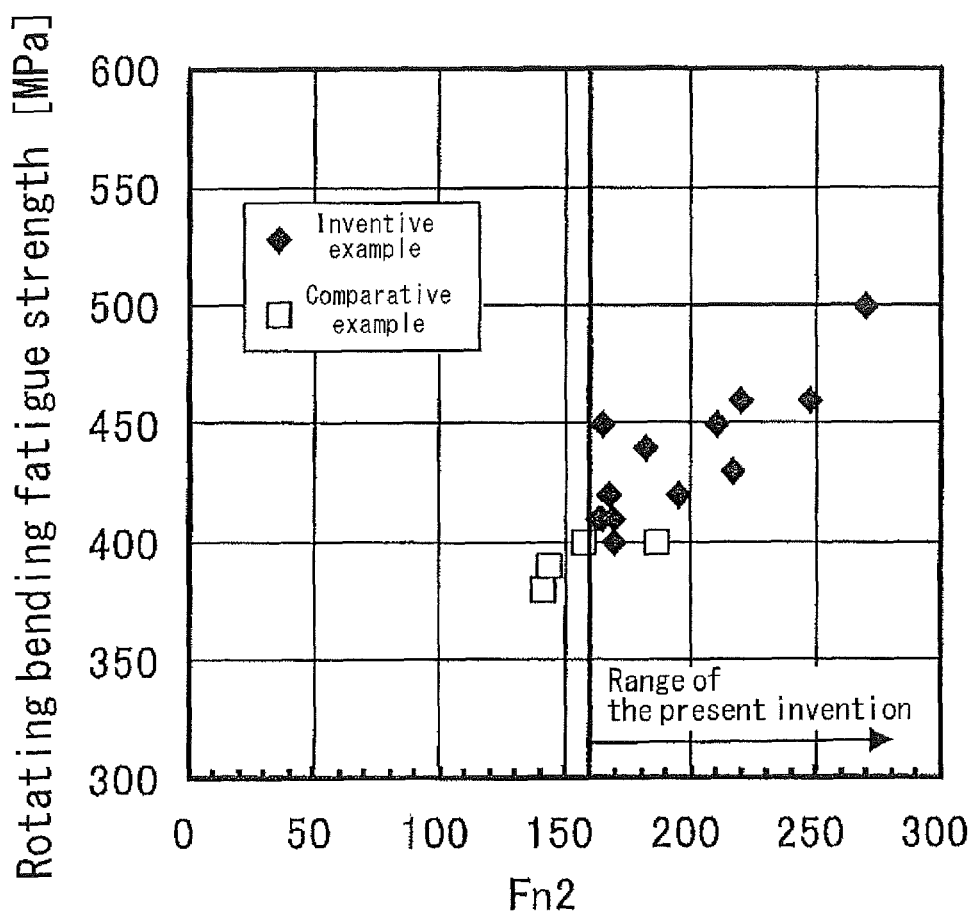
FIG. 17 is a graph summarizing the relationship between the Fn2 expressed by the formula (2) and the rotating bending fatigue strength in the Investigation 6 in the EXAMPLES.
Figure 18:
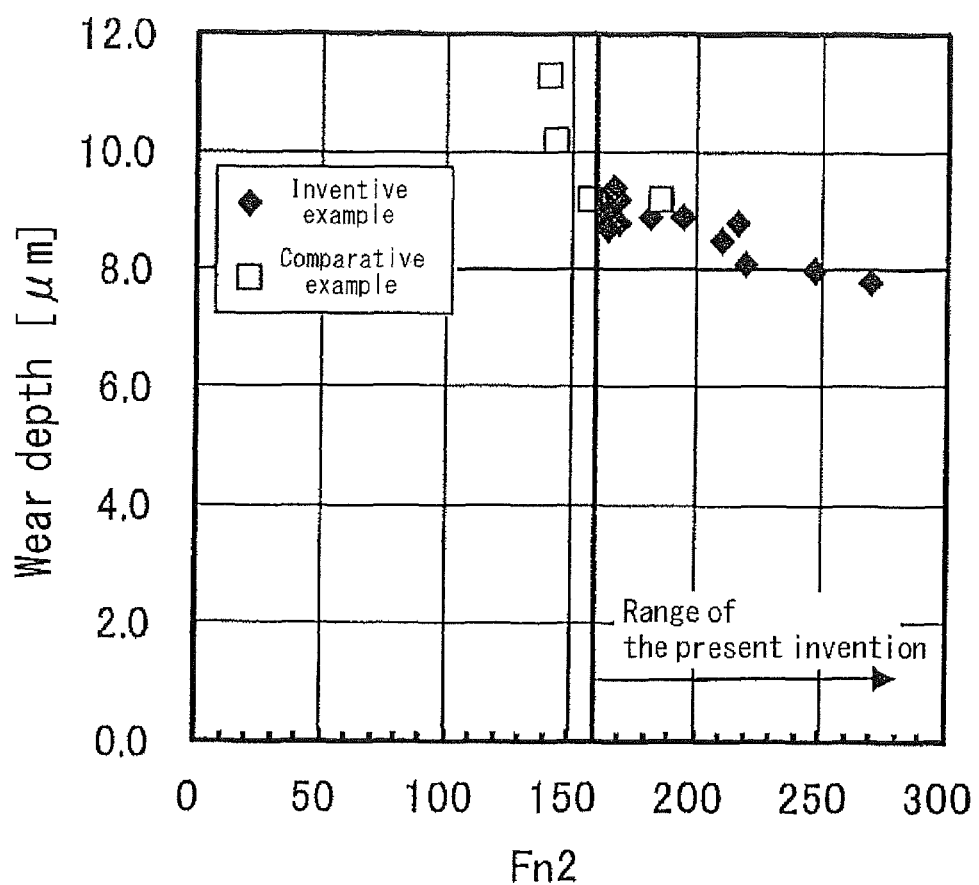
FIG. 18 is a graph summarizing the relationship between the Fn2 expressed by the formula (2) and the wear depth in the Investigation 7 in the EXAMPLES.

FIGS. 16 to 18 summarize the relationship between the Fn2 and the surface hardness (HV) after nitriding in the Investigation 5, the relationship between the Fn2 and the rotating bending fatigue strength in the Investigation 6, and the relationship between the Fn2 and the wear depth in the Investigation 7, respectively.

TABLE 2

| Division | Test No. | Steel | Microstructure Phase | Area fraction of ferrite (%) | Content of V in precipitates (%) | Hardness before nitriding [HV] | Machinability Cutting resistance (N) | Chip disposability |
|---|---|---|---|---|---|---|---|---|
| Inventive examples | 1 | 1 | F + P + B | 72 | 0.04 | 193 | 612 | ⊙ |
| | 2 | 2 | F + P | 71 | 0.02 | 162 | 601 | ○ |
| | 3 | 3 | F + P | 75 | 0.03 | 172 | 597 | ⊙ |
| | 4 | 4 | F + P + B | 74 | 0.04 | 221 | 623 | ⊙ |
| | 5 | 5 | F + P | 68 | 0.05 | 198 | 615 | ⊙ |
| | 6 | 6 | F + P + B | 69 | 0.06 | 224 | 629 | ⊙ |
| | 7 | 7 | F + P | 61 | 0.02 | 202 | 625 | ⊙ |
| | 8 | 8 | F + P | 56 | 0.03 | 204 | 616 | ⊙ |
| | 9 | 9 | F + P | 61 | 0.06 | 198 | 605 | ⊙ |
| | 10 | 10 | F + P | 66 | 0.06 | 245 | 635 | ⊙ |
| | 11 | 11 | F + P | 71 | 0.05 | 224 | 632 | ⊙ |
| | 12 | 12 | F + B | 74 | 0.08 | 232 | 630 | ⊙ |
| | 13 | 13 | F + P | 65 | 0.09 | 161 | 600 | ○ |
| Comparative examples | 14 | *14 | F + P | 68 | — | 165 | 608 | ○ |
| | 15 | *15 | F + B | 38 | **0.25 | 272 | #672 | ⊙ |
| | 16 | *16 | F + P | 74 | 0.02 | 155 | 605 | ○ |
| | 17 | *17 | F + P | 65 | 0.03 | 172 | 621 | ○ |
| | 18 | *18 | F + P | 85 | 0.03 | 132 | #651 | #x |
| | 19 | 19 | **F + B + M | **16 | 0.02 | 248 | #662 | ○ |

In the column of "Microstructure", "F", "P", "B" and "M" denote ferrite, pearlite, bainite and martensite respectively.
With regard to the Test No. 14, the steel 14 did contain no V; thus the mark "—" in the column of "Content of V in precipitates" denotes that V was not detected in the precipitates.
The mark "*" indicates falling outside the conditions of chemical composition regulated by the present invention.
The mark "**" indicates falling outside the conditions of "Microstructure" regulated by the present invention, or indicates falling outside the condition of "Content of V in precipitates determined by the extraction residue analysis" regulated by the present invention.
The mark "#" indicates falling short of the target in the present invention.

TABLE 3

| Division | Test No. | Steel | Hardness before nitriding [HV] | Hardness after nitriding Core hardness [HV] | Hardness after nitriding Surface hardness [HV] | Age hardening amount due to nitriding [ΔHV] | Effective case depth (mm) | Rotating bending fatigue strength (MPa) | Wear depth (μm) | Indentation deformation amount (μm) |
|---|---|---|---|---|---|---|---|---|---|---|
| Inventive examples | 1 | 1 | 193 | 213 | 720 | 20 | 0.25 | 430 | 8.8 | 4.8 |
| | 2 | 2 | 162 | 181 | 689 | 19 | 0.22 | 410 | 9.2 | 5.2 |
| | 3 | 3 | 172 | 195 | 689 | 23 | 0.24 | 410 | 8.9 | 5.4 |
| | 4 | 4 | 221 | 245 | 730 | 24 | 0.24 | 450 | 8.5 | 5.0 |
| | 5 | 5 | 198 | 232 | 685 | 34 | 0.22 | 420 | 8.9 | 5.5 |
| | 6 | 6 | 224 | 248 | 745 | 24 | 0.26 | 460 | 8.0 | 4.8 |
| | 7 | 7 | 202 | 214 | 681 | 12 | 0.21 | 400 | 8.8 | 5.2 |
| | 8 | 8 | 204 | 212 | 684 | 8 | 0.20 | 410 | 9.2 | 5.4 |
| | 9 | 9 | 198 | 221 | 678 | 23 | 0.21 | 420 | 9.4 | 5.6 |
| | 10 | 10 | 245 | 264 | 702 | 19 | 0.23 | 440 | 8.9 | 5.0 |
| | 11 | 11 | 224 | 249 | 705 | 25 | 0.21 | 450 | 8.7 | 5.3 |
| | 12 | 12 | 232 | 242 | 768 | 10 | 0.23 | 500 | 7.8 | 4.6 |
| | 13 | 13 | 161 | 201 | 732 | 40 | 0.22 | 460 | 8.1 | 4.7 |

TABLE 3-continued

| Division | Test No. | Steel | Hardness before nitriding [HV] | Hardness after nitriding | | Age hardening amount due to nitriding [ΔHV] | Effective case depth (mm) | Rotating bending fatigue strength (MPa) | Wear depth (μm) | Indentation deformation amount (μm) |
|---|---|---|---|---|---|---|---|---|---|---|
| | | | | Core hardness [HV] | Surface hardness [HV] | | | | | |
| Comparative examples | 14 | *14 | 165 | $ 160 | $ 582 | −5 | $ 0.12 | # 380 | # 11.3 | # 6.3 |
| | 15 | *15 | 272 | 343 | 778 | 71 | 0.22 | 470 | 7.5 | 4.4 |
| | 16 | *16 | 155 | $ 165 | 684 | 10 | 0.20 | 400 | 9.2 | # 6.1 |
| | 17 | *17 | 172 | 181 | $ 642 | 9 | 0.20 | # 390 | # 10.2 | 5.9 |
| | 18 | *18 | 132 | $ 152 | 652 | 20 | 0.23 | 400 | 9.2 | # 6.5 |
| | 19 | 19 | 248 | 255 | 711 | 7 | 0.22 | 430 | 8.9 | 4.9 |

"Age hardening amount due to nitriding" indicates the difference between the core hardness (HV) after nitriding and the hardness (HV) before nitriding.
The mark "*" indicates falling outside the conditions of chemical composition regulated by the present invention.
The mark "$" indicates falling outside the conditions of the properties after nitriding regulated by the present invention.
The mark "#" indicates falling short of the target in the present invention.

From Tables 2 and 3, it is apparent that, in the case of test Nos. 1 to 13 of the "inventive examples" in which the starting material before nitriding satisfied the conditions regulated by the present invention, the cutting resistance was small and the chip disposability was evaluated as "Good (o)" or "Excellent (oo)", and thus excellent machinability was ensured. Moreover, in the case of the said test numbers, all conditions of the core hardness, surface hardness, and effective case depth regulated by the present invention were satisfied after nitriding, and thus excellent deformation resistance, high rotating bending fatigue strength and excellent wear resistance were ensured.

It is apparent that, among the "inventive examples", in the case of test Nos. 1, 3, 5 and 9, in which the steel 1 containing Te, the steel 3 containing Pb and Ca, the steel 5 containing Se and Sb, and the steel 9 containing Bi were used respectively, the machinability was extremely excellent.

In contrast, in the case of test No. 14 of the "comparative example", the used steel 14 contained no V and deviated from the range regulated by the present invention, the Fn1 was zero and deviated from the range of "20 to 80" regulated by the present invention, and moreover the core hardness after nitriding was 160 in HV, which was lower than the value regulated by the present invention; thus the deformation resistance was poor, that is to say in the concrete, the indentation deformation amount was as large as 6.3 μm. In addition, in the steel 14, the Fn2 was 140 and deviated from the restriction of the present invention of being "160 or more", additionally the effective case depth after nitriding was 0.12 mm, which was smaller than the value regulated by the present invention, the surface hardness after nitriding was 582 in HV, which was lower than the value regulated by the present invention; thus the rotating bending fatigue strength was as low as 380 MPa, and moreover the wear resistance was poor, that is to say in the concrete, the wear depth was as large as 11.3 μm.

In the case of test No. 15, the content of V in precipitates determined by the extraction residue analysis of the used steel 15 was as high as 0.25%, and moreover the hardness before nitriding was as high as 272 in HV, thus the cutting resistance was high, and therefore the machinability was poor.

In the case of test No. 16, the Fn1 of the used steel 16 was 19 and deviated from the range of "20 to 80" regulated by the present invention, and moreover the core hardness after nitriding was 165 in HV, which was lower than the value regulated by the present invention; thus the deformation resistance was poor, that is to say in the concrete, the indentation deformation amount was as large as 6.1 μm.

In the case of test No. 17, the Fn2 of the used steel 17 was 143 and deviated from the restriction of the present invention of being "160 or more", and moreover the surface hardness after nitriding was 642 in HV, which was lower than the value regulated by the present invention; thus the rotating bending fatigue strength was as low as 390 MPa, and moreover the wear resistance was poor, that is to say in the concrete, the wear depth was as large as 10.2 μm.

In the case of test No. 18, the content of V of the used steel 18 was 0.12%, which was lower than the value regulated by the present invention. Consequently, the core hardness after nitriding was 152 in HV, which was lower than the value regulated by the present invention; thus the deformation resistance was poor, that is to say in the concrete, the indentation deformation amount was as large as 6.5 μm. In addition, the chip disposability was deteriorated and the cutting resistance was 651N, thus the machinability was poor.

In the case of test No. 19, although the chemical composition of the used steel 19 satisfied the condition regulated by the present invention, the microstructure before nitriding contained martensite, and moreover the area fraction of ferrite was 16% which was lower than the value regulated by the present invention. Therefore, the cutting resistance was high and the machinability was poor.

INDUSTRIAL APPLICABILITY

The steel material for nitriding of the present invention is excellent in machinability, particularly in chip disposability, and also can provide a component subjected to a nitriding treatment with high core hardness, high surface hardness and a large effective case depth. Therefore, the steel material for nitriding of the present invention is used suitably as a starting material for a nitrided component.

In addition, the nitrided component of the present invention is excellent in deformation resistance, bending fatigue strength, and wear resistance; and therefore it can be used suitably as a component for machine structural use that is used for an automobile transmission and the like, such as a gear and a pulley for a CVT.

The invention claimed is:
1. A steel material for nitriding, having a chemical composition comprising, by mass percent, C: more than 0.15% and not more than 0.35%, Si: 0.20% or less, Mn: 0.10 to 2.0%, P: 0.030% or less, S: 0.050% or less, Cr: 0.80 to 2.0%, V: 0.10 to 0.50%, Al: 0.01 to 0.06%, N: 0.0080% or less, and O: 0.0030% or less, with the balance being Fe and impurities, and further the Fn1 expressed by the formula (1)

described below is 20 to 80, and the Fn2 expressed by the formula (2) described below is 160 or more; wherein
    a microstructure of the steel material is a ferritic-pearlitic structure, a ferritic-bainitic structure, or a ferritic-pearlitic-bainitic structure,
    an area fraction of ferrite in the microstructure is 20% or more, and
    a content of V in precipitates determined by an extraction residue analysis is 0.10% or less:

$$Fn1=(669.3 \times \log_e C - 1959.6 \times \log_e N - 6983.3) \times (0.067 \times Mo + 0.147 \times V) \quad (1);$$

$$Fn2 = 140 \times Cr + 125 \times Al + 235 \times V \quad (2);$$

where, each symbol C, N, Mo, V, Cr and Al in the above formulas (1) and (2) represents the content by mass percent of the element concerned.

2. A steel material for nitriding, having a chemical composition comprising, by mass percent, C: more than 0.15% and not more than 0.35%, Si: 0.20% or less, Mn: 0.10 to 2.0%, P: 0.030% or less, S: 0.050% or less, Cr: 0.80 to 2.0%, V: 0.10 to 0.50%, Al: 0.01 to 0.06%, N: 0.0080% or less, O: 0.0030% or less, and one or more kinds of elements selected from the items <a> to <d> described below with the balance being Fe and impurities, and further the Fn1 expressed by the formula (1) described below is 20 to 80, and the Fn2 expressed by the formula (2) described below is 160 or more; wherein
    a microstructure of the steel material is a ferritic-pearlitic structure, a ferritic-bainitic structure, or a ferritic-pearlitic-bainitic structure,
    an area fraction of ferrite in the microstructure is 20% or more, and
    a content of V in precipitates determined by an extraction residue analysis is 0.10% or less:

$$Fn1=(669.3 \times \log_e C - 1959.6 \times \log_e N - 6983.3) \times (0.067 \times Mo + 0.147 \times V) \quad (1);$$

$$Fn2 = 140 \times Cr + 125 \times Al + 235 \times V \quad (2);$$

where, each symbol C, N, Mo, V, Cr and Al in the above formulas (1) and (2) represents the content by mass percent of the element concerned;
    <a> Mo: less than 0.10%;
    <b> Cu: 0.50% or less and Ni: 0.50% or less;
    <c> Ti: 0.20% or less, Nb: 0.10% or less and Zr: 0.10% or less;
    <d> Pb: 0.50% or less, Ca: 0.010% or less, Bi: 0.30% or less, Te: 0.30% or less, Se: 0.30% or less, and Sb: 0.30% or less.

3. A nitrided component having a chemical composition according to claim 1, wherein a core hardness thereof is 180 or more in Vickers hardness, a surface hardness thereof is 650 or more in Vickers hardness, and an effective case depth thereof is 0.20 mm or more.

4. A nitrided component having a chemical composition according to claim 2, wherein a core hardness thereof is 180 or more in Vickers hardness, a surface hardness thereof is 650 or more in Vickers hardness, and an effective case depth thereof is 0.20 mm or more.

\* \* \* \* \*